US008263189B2

(12) United States Patent
Mataki et al.

(10) Patent No.: US 8,263,189 B2
(45) Date of Patent: Sep. 11, 2012

(54) LAYER FORMING METHOD AND LAYER FORMING APPARATUS, AND METHOD OF MANUFACTURING RADIATION DETECTOR

(75) Inventors: Hiroshi Mataki, Kanagawa (JP);
Hirotaka Watano, Kanagawa (JP);
Seiichi Inoue, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 650 days.

(21) Appl. No.: 12/382,803

(22) Filed: Mar. 24, 2009

(65) Prior Publication Data
US 2009/0246402 A1 Oct. 1, 2009

(30) Foreign Application Priority Data

Mar. 25, 2008 (JP) .................................. 2008-079315

(51) Int. Cl.
*C23C 14/02* (2006.01)
(52) U.S. Cl. ........................................................ 427/534
(58) Field of Classification Search .................. 430/133; 427/466; 428/32.1
See application file for complete search history.

(56) References Cited

U.S. PATENT DOCUMENTS

| 4,598,303 A * | 7/1986 | Peekema et al. ................ 347/71 |
| 2006/0263953 A1* | 11/2006 | Bonfiglio ....................... 438/151 |
| 2009/0321123 A1* | 12/2009 | Lochtman et al. ............. 174/261 |
| 2010/0258788 A1* | 10/2010 | Radu et al. ...................... 257/40 |

FOREIGN PATENT DOCUMENTS

| GB | 2085807 | * | 6/1982 |
| JP | 6-246910 | | 9/1994 |
| JP | 408131982 | * | 5/1996 |
| JP | 2003-220695 | | 8/2003 |
| JP | 2004-165480 | | 6/2004 |

* cited by examiner

*Primary Examiner* — Michael Cleveland
*Assistant Examiner* — Tabassom Tadayyon Eslami
(74) *Attorney, Agent, or Firm* — Jean C. Edwards, Esq.; Edwards Neils PLLC

(57) ABSTRACT

A layer-forming apparatus coats a solution containing a layer component and a flammable solvent on a surface of a base material, and forms a layer on the surface of the base material. In the layer-forming apparatus, a coating chamber in which the solution is coated on the surface of the base material is closed substantially hermetically, and a clean air is supplied from a clean-air supplier to the coating chamber. Then, ions that are produced by a corona discharger are sprayed to the surface of the base material in a state that a vapor concentration of the solvent in the coating chamber is below a burning lower limit, and dusts are removed from the base material. Then, the solution is coated on the surface of the base material from which the dusts are removed.

4 Claims, 13 Drawing Sheets

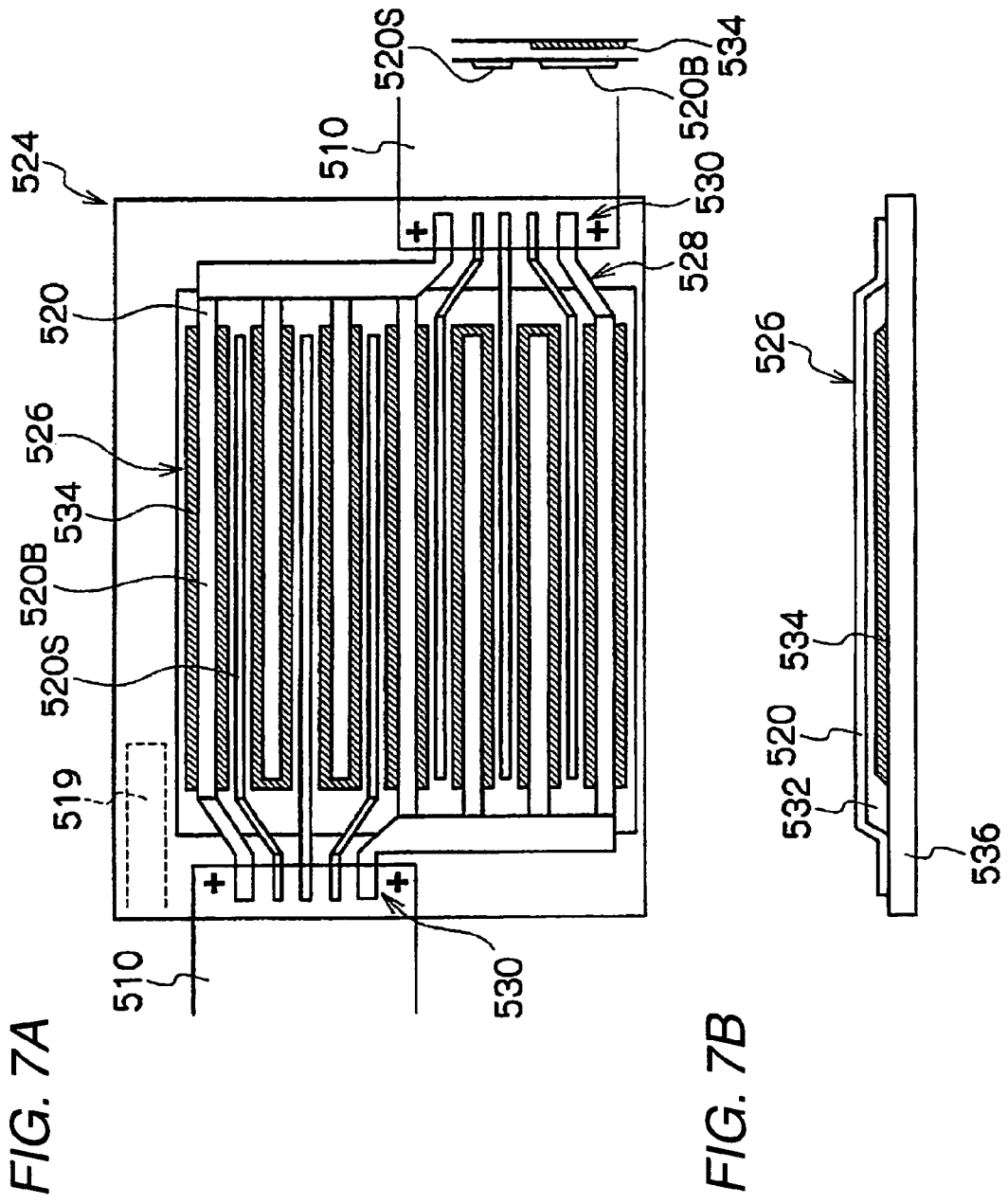

LAYER FORMING METHOD AND LAYER FORMING APPARATUS, AND METHOD OF MANUFACTURING RADIATION DETECTOR

The present application claims priority from Japanese Patent Application No. 2008-079315 filed on Mar. 25, 2008, the entire content of which is incorporated herein by reference.

BACKGROUND OF INVENTION

1. Field of the Invention

The present invention relates to a layer-forming method and a layer-forming apparatus, and a method of manufacturing a radiation detector.

2. Description of the Related Art

As the radiation detector, such a structure has been known that a suppressing layer for suppressing an interfacial crystallization of a recording photoconductive layer is provided between a first electrode and the recording photoconductive layer, and this suppressing layer is formed of an organic polymer layer. Here, this organic polymer layer has an insulating property against the charges of opposite polarity to the charges that move through the first electrode in recording image information, and an electrical conductivity to the charges of equal polarity to the charges that move through the first electrode (see JP-A-2004-165480, for example).

According to the radiation detector having the above configuration, remaining charges in the suppressing layer caused when radiation images are recorded and read by using a large radiation to be reduced, and also deterioration in sensitivity, remaining of ghost images, etc. caused due to the remaining charges to be prevented.

An organic polymer layer such as PVK, or the like, for example, is employed as the material of the organic polymer layer, and the suppressing layer is formed on the surface of the photoconductive layer by the dipping method, or the like. As a solvent, an unflammable solvent such as methylene chloride, or the like or a flammable solvent such as 1-1-dichloroethane, or the like is employed. Regarding such layer formation, the technology to employ the ink jet method that is known in the printing field has been proposed recently.

In the printing field, in order to prevent deterioration in impact position precision of the ink jet droplet on account of charges of a printed matter, the technology to remove the charges from the printed matter by spraying ions produced by the corona discharge together with an air onto the printed matter has been known (see JP-A-6-246910, for example).

Also, in the printing field, in order to prevent the nozzle clogging of the ink jet head due to the adhesion of dusts, similarly the technology to reduce the entry of dusts into the case by creating an air flow that is directed from the inside of the case in which the ink jet head is placed to the outside has been known (see JP-A-2003-220695, for example).

In forming the layer on a surface of the base material, the dusts adhered to the surface of the base material exert a bad influence upon the layer formation and also exert a bad influence upon the performance of the base material on which the layer is formed. For example, when the organic polymer layer is stacked in such a situation that the dusts adhered to the surface of the photoconductive layer are not removed, detectable defects occur at the dust locations in the radiation detector.

In the technology disclosed in JP-A-6-246910, such advantages can be expected that the dusts adhered electrostatically to the surface of the base material are easily removed and also new dusts are hard to adhere electrostatically to the surface of the base material. However, some dusts adhere to the surface of the base material in a non-electrostatic manner, so that it is expected that the entry of dusts into the case should be suppressed. Also, in the technology disclosed in JP-A-6-246910, because a corona discharge is brought about upon removing the charges from the base material, it is needed to restrict the use of the flammable solvent.

In the technology disclosed in JP-A-6-246910, the entry of dusts into the case can be reduced, but the dusts that have already been adhered to the surface of the base material cannot be removed. In this case, in JP-A-2003-220695, in order to prevent the nozzle clogging of the ink jet head, an electric field is applied such that the dusts adhered to the surface of the base material are not left from the surface of the base material.

SUMMARY OF INVENTION

The present invention has been made in view of the above circumstances and it is an object of the present invention to provide a layer-forming method and a layer-forming apparatus, capable of suppressing adhesion of dusts onto a surface of a base material upon forming a layer on the surface of the base material by using a flammable solvent. Also, it is an object of the present invention to provide a method of manufacturing a radiation detector capable of reducing detectable defects.

The above object can be attained by providing the following layer-forming method according to the present invention.

(1) A layer-forming method may include supplying a clean air to a coating chamber which is substantially hermetically closed and in which a solution containing a layer component and a flammable solvent is to be coated on a surface of a base material; removing a dust from the surface of the base material by spraying an ion, which is produced by a corona discharge, to the surface of the base material in a state that a vapor concentration of the flammable solvent in the coating chamber is below a lower limit of a flammability of the flammable solvent, and coating the solution on the surface of the base material from which the dust is removed.

(2) The coating may be conducted by an ink jet method.

(3) A nozzle of an ink jet head utilized in the ink jet method may be capped when the ion is sprayed to the surface of the base material.

(4) At least one of an air speed of the clean air and an air pressure of the clean air may be weakened when the solution is coated on the surface of the base material.

According to the layer-forming method given by above (1), the entry of the dusts into the coating chamber can be suppressed by supplying the clean air to the coating chamber. Also, since the clean air is supplied to the coating chamber, the vapor concentration of the solvent in the coating chamber can be suppressed below the burning lower limit even when the flammable solvent is employed, and the ion spraying that brings about the corona discharge can be applied. Also, since the ions are sprayed to the surface of the base material, the dusts adhered electrostatically to the surface of the base material are ready to remove and also the new dusts are hard to adhere electrostatically to the surface of the base material. Also, the dusts adhered to the surface of the base material in a non-electrostatic manner such as the falling, or the like can be blown away and removed.

According to the layer-forming method given by above (2), the layer can be formed precisely in a non-contact manner with respect to the base material by a small amount of consumed liquid without a mask.

According to the layer-forming method given by above (3), a leakage of the solution containing the flammable solvent from the nozzle can be prevented without fail. Accordingly, it can be expected perfectly that the ignition should be prevented.

According to the layer-forming method given by above (4), the abrupt drying of the solution that is coated on the surface of the base material can be suppressed. Accordingly, the levering property of the solution can be improved, and the uniform layer can be formed.

Also, the above object can be attained by providing the following layer-forming apparatus according to the present invention.

(5) A layer-forming apparatus may include a coating chamber which is substantially hermetically closed and in which a solution containing a layer component and a flammable solvent is to be coated on a surface of a base material, a concentration detector which detects a vapor concentration of the flammable solvent in the coating chamber, a clean-air supplier which supplies a clean air to the coating chamber and which adjusts the vapor concentration to be below a lower limit of a flammability based on a value detected by the concentration detector, a corona discharger which produces an ion to remove a charge from the base material, a spraying unit which sprays the ion to the surface of the base material in a state that the vapor concentration is below the lower limit of the flammability so that the spraying unit removes a dust from the surface of the base material; and a coating unit which coats the solution on the surface of the base material from which the dust is removed.

(6) The coating unit may be conducted by an ink jet method.

(7) A nozzle of an ink jet head utilized in the ink jet method may be capped when the ion is sprayed to the surface of the base material.

(8) The clean-air supplier may be weaken at least one of an air speed of the clean air and an air pressure of the clean air when the solution is coated on the surface of the base material.

(9) The corona discharger may be arranged out of an upward area of the surface of the base material on which the solution is coated.

(10) The clean-air supplier may spray the clean air to the surface of the base material, the corona discharger is arranged in a supply path of the clean air, and the clean-air supplier doubles as the spraying unit.

(11) The clean-air supplier may include a suction fan which introduces an outer air into the coating chamber, and a filter which filters the suctioned air, the filter includes two layers that have a first layer arranged on a coating chamber side and a second layer, and a filtering mesh of the first layer is coarser than that of the second layer, and the second layer is exchangeable independently.

According to the layer-forming apparatus given by above (5), the entry of the dusts into the coating chamber can be suppressed by supplying the clean air to the coating chamber. Also, since the clean air is supplied to the coating chamber, the vapor concentration of the solvent in the coating chamber can be suppressed below the burning lower limit even when the flammable solvent is employed, and the ion spraying that brings about the corona discharge can be applied. Also, since the ions are sprayed to the surface of the base material, the dusts adhered electrostatically to the surface of the base material are ready to remove and also the new dusts are hard to adhere electrostatically to the surface of the base material. Also, the dusts adhered to the surface of the base material in a non-electrostatic manner such as the falling, or the like can be blown away and removed.

According to the layer-forming apparatus given by above (6), the layer can be formed precisely in a non-contact manner with respect to the base material by a small amount of consumed liquid without a mask.

According to the layer-forming apparatus given by above (7), a leakage of the solution containing the flammable solvent from the nozzle can be prevented without fail. Accordingly, it can be expected perfectly that the ignition should be prevented.

According to the layer-forming apparatus given by above (8), the abrupt drying of the solution that is coated on the surface of the base material can be suppressed. Accordingly, the levering property of the solution can be improved, and the uniform layer can be formed.

According to the layer-forming apparatus given by above (9), such a situation can be avoided that, even though the dust producing substances fall, the dusts adhere to the surface of the base material.

According to the layer-forming apparatus given by above (10), simplification of the layer-forming apparatus can be achieved.

According to the layer-forming apparatus given by above (11), the entry of the dusts into the coating chamber in exchanging the filter can be suppressed.

Also, the above object can be attained by providing the following method of manufacturing the radiation detector according to the present invention.

(12) A manufacturing method of a radiation detector which includes a first electrode through which radiation carrying image information passes, an organic polymer layer, a photoconductive layer which produces a charge by irradiating the radiation which is passed through the first electrode, and a second electrode which collects the charge that the photoconductive layer produces, in this order, the manufacturing method may include forming the organic polymer layer by a layer-forming method on a surface of a base material on which at least the second electrode and the photoconductive layer is stacked.

According to the method of manufacturing the radiation detector given by above (12), the organic polymer layer can be formed on the surface of the photoconductive layer in a state that the dusts on the surface of the photoconductive layer are removed sufficiently. Accordingly, the radiation detector capable of reducing the detectable defects can be manufactured.

According to the present invention, the layer-forming method and the layer-forming apparatus, capable of suppressing the adhesion of dusts onto the surface of the base material upon forming the layer on the surface of the base material by using a flammable solvent can be provided. Also, according to the present invention, the method of manufacturing the radiation detector, capable of reducing the detectable defects can be provided.

DESCRIPTION OF EXEMPLARY EMBODIMENTS

Next, exemplary embodiments of a layer-forming method and a layer-forming apparatus and a method of manufacturing a radiation detector according to the present invention will be explained with reference to drawings hereinafter.

The radiation detector of the exemplary embodiment is employed in X-ray photographing equipment, and the like, and is equipped with an electrostatic recording portion containing the photoconductive layer that exhibits conductivity when it receives the irradiation of the radiation. This radiation detector records image information when it receives an irradiation of radiation that bears an image information, and then outputs image signals representing a recorded image information.

As the radiation detector, there are a radiation detecting substrate 500 of the type in which the charges are read by utilizing a semiconductor material that generates charges in response to the irradiation of light, i.e., so-called optical reading type, a radiation detector 400 of the type in which the charges generated in response to the irradiation of radiation are stored and the stored charges are read by turning ON/OFF an electric switch such as a thin layer transistor (TFT), or the like one pixel by one pixel (referred to as "TFT type" hereinafter), and the like.

(Configuration of TFT Type Radiation Detector 400)

Figure 1:
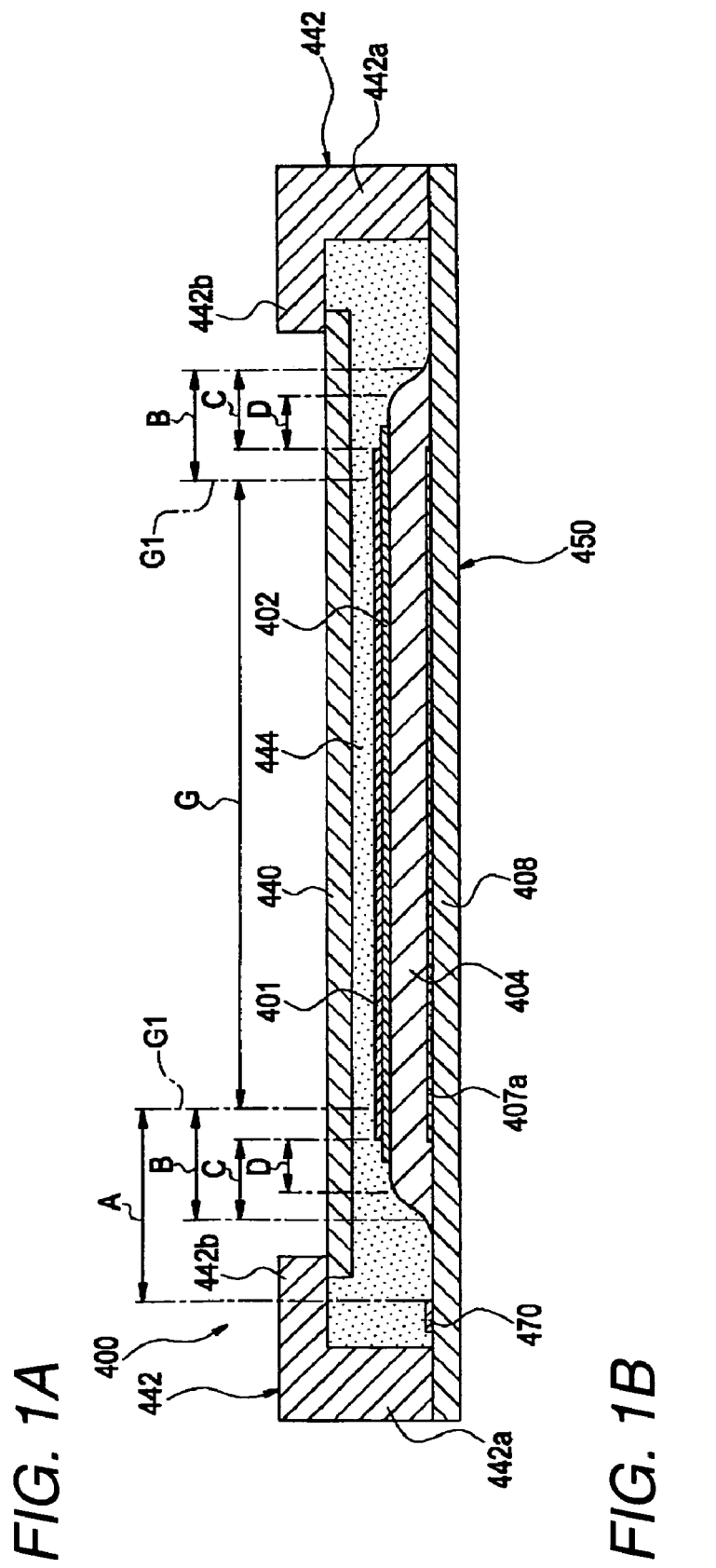
FIG. 1A is a schematic view showing an overall configuration of a TFT type radiation detector.
FIG. 1B is a schematic view showing a part of a photoconductive layer.
Figure 2:
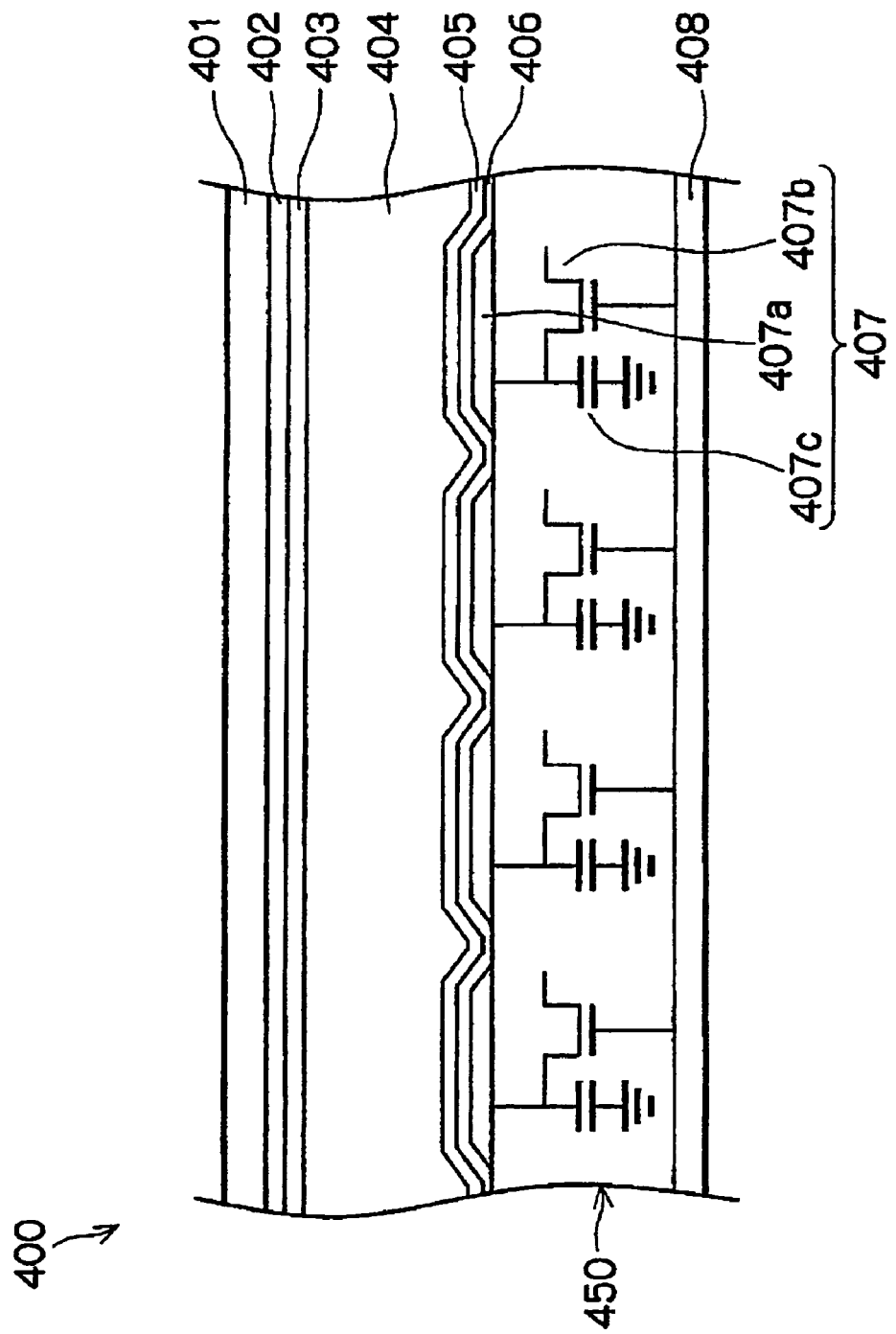
FIG. 2 is a schematic configurative view showing a pertinent portion of the TFT type radiation detector, FIG. 3 a sectional view showing a configuration of one pixel unit of the TFT type radiation detector, FIG. 4 a plan view showing the configuration of one pixel unit of the TFT type radiation detector, FIG. 5 a graph showing a relationship between a shear rate and a shear viscosity of a discharged liquid used in forming a hole injection blocking layer in the TFT type radiation detector, FIG. 6A a view showing a schematic configuration of a radiation detecting substrate as an optical reading type radiation detector, FIG. 6B a sectional showing the schematic configuration of the radiation detecting substrate as the optical reading type radiation detector, FIG. 7A a view showing a schematic configuration of a radiation detecting lower substrate of the radiation detecting substrate shown in FIG. 6A, FIG. 7B a view showing the schematic configuration of the radiation detecting lower substrate of the radiation detecting substrate shown in FIG. 6B, FIG. 8 a schematic view showing schematically a configuration of the radiation detecting substrate shown in FIG. 6A, FIG. 9 a view showing a sealing configuration for sealing an upper electrode of the radiation detecting substrate shown in FIG. 6A, FIG. 10 a block diagram showing a configuration of a charge extracting amplifier and connection modes of an image processing equipment provided out of the radiation detecting substrate, FIG. 11 a schematic view showing a situation when a line light is scanned as a reading light, FIG. 12A a view showing an example where the configuration of the hole injection blocking layer in the TFT type radiation detector shown in FIG. 1A is applied to the radiation detecting substrate shown in FIG. 6A.

First, a configuration of the TFT type radiation detector 400 will be explained hereunder. FIG. 1A is a schematic view showing an overall configuration of the TFT type radiation detector 400. FIG. 2 is a view showing a pertinent configuration the TFT type radiation detector 400, and a view showing respective portions that are stacked on a glass substrate.

As shown in FIG. 1A and FIG. 2, the TFT type radiation detector 400 according to the exemplary embodiment has a photoconductive layer 404 that exhibits electromagnetic conductivity, as a charge converting layer that generates the charges when X-rays as an example of the radiation that bears the image information are incident into this layer. As the material of the photoconductive layer 404, an amorphous material whose dark resistance is high and which exhibits good electromagnetic conductivity in response to the X-ray irradiation and of which a large-area layer can be formed at a low temperature by the vacuum deposition method is better.

As the amorphous material, for example, an amorphous Se (a-Se) layer is employed. Also, a material obtained by doping As, Sb, Ge into the amorphous Se is excellent in thermal stability, and serves as the preferred material of the photoconductive layer 404.

As a first electrode through which the radiation that bears the image information passes, a bias electrode 401 for applying a bias voltage to the photoconductive layer 404 is formed on the photoconductive layer 404. The bias electrode 401 is formed of gold (Au), for example. The radiation that passed through this bias electrode 401 is irradiated onto the photoconductive layer 404.

As second electrodes for collecting the charges that the photoconductive layer 404 generates, a plurality of charge collecting electrodes 407a are formed on the opposite side to the side on which the bias electrode 401 is provided over the photoconductive layer 404, i.e., under the photoconductive layer 404. As shown in FIG. 2, each of the charge collecting electrodes 407a is connected to a charge storage capacitor 407c and a switching element 407b respectively. Also, the charge collecting electrodes 407a are formed on a glass substrate 408.

Also, as shown in FIG. 1A and FIG. 2, a whole injection blocking layer 402 having a hole blocking material is provided as an organic polymer layer between the photoconductive layer 404 and the bias electrode 401. Here, the organic polymer layer may also be used as a charge injection blocking layer that has charge selectivity. The wording "the charge injection blocking layer has the charge selectivity" means that this charge injection blocking layer has such a quantity that blocks the charges (holes when a positive bias is applied to the bias electrode 401 or electrons when a negative bias is applied to the bias electrode 401) flown out from the bias electrode 401 but passes the charges flown into the bias electrode 401.

That is, as the charge injection blocking layer, either a hole injection blocking layer that serves as a conductor to the electrons but blocks the injection of holes is employed or an electron injection blocking layer that serves as a conductor to the holes but blocks the injection of electrons is employed. In the exemplary embodiment, the bias electrode 401 is a positive electrode, and thus the hole injection blocking layer 402 is provided as the organic polymer layer.

As the hole injection blocking layer 402, a layer that is formed by mixing a hole blocking material into an insulating polymer such as polycarbonate, polystyrene, polyimide, polycycloolefin, or the like can be employed.

At least one type of the hole blocking materials contained in the hole injection blocking layer 402 is at least one type selected from carbon clusters or their derivatives. Also, the carbon cluster is at least one selected from fullerene C60, fullerene C70, fullerene oxide, or their derivatives.

As shown in FIG. 2, an electron injection blocking layer 406 is provided between the photoconductive layer 404 and the charge collecting electrodes 407a.

Also, crystallization preventing layers 403, 405 are provided between the hole injection blocking layer 402 and the photoconductive layer 404 and between the electron injection blocking layer 406 and the photoconductive layer 404 respectively. As the crystallization preventing layers 403, 405, GeSe, GeSe$_2$, Sb$_2$Se$_3$, a-As$_2$Se$_3$, Se—As, Se—Ge, Se—Sb compounds, or the like can be employed.

An active matrix layer 407 is composed of the charge collecting electrode 407a, the switching element 407b, and the charge storage capacitor 407c. Also, an active matrix substrate 450 is composed of the glass substrate 408 and the active matrix layer 407.

Figure 3:
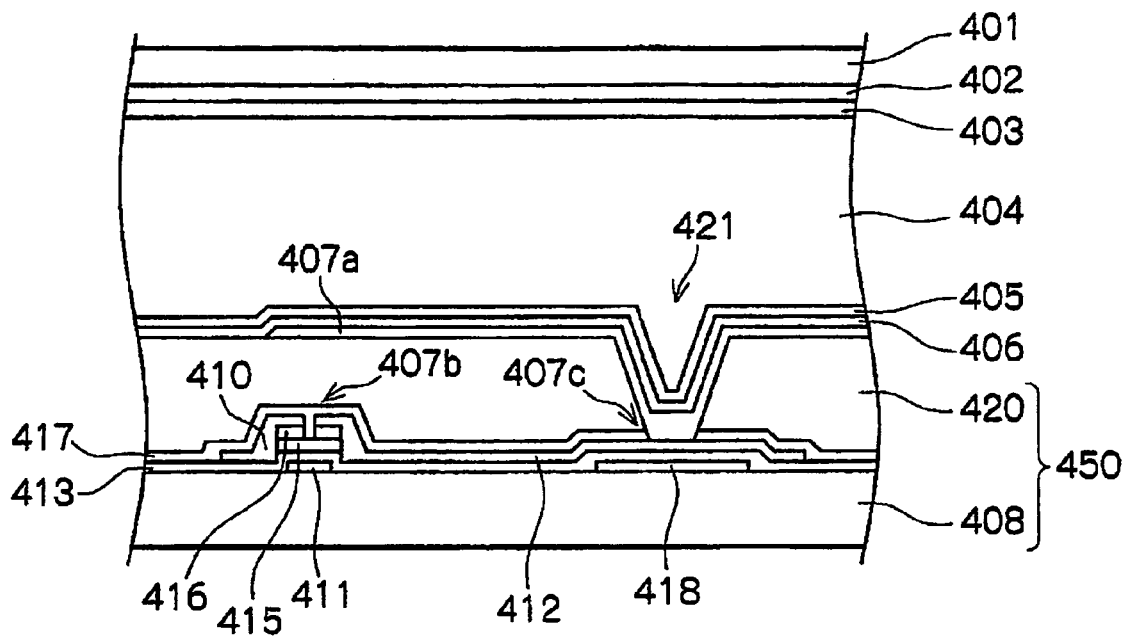
Figure 4:
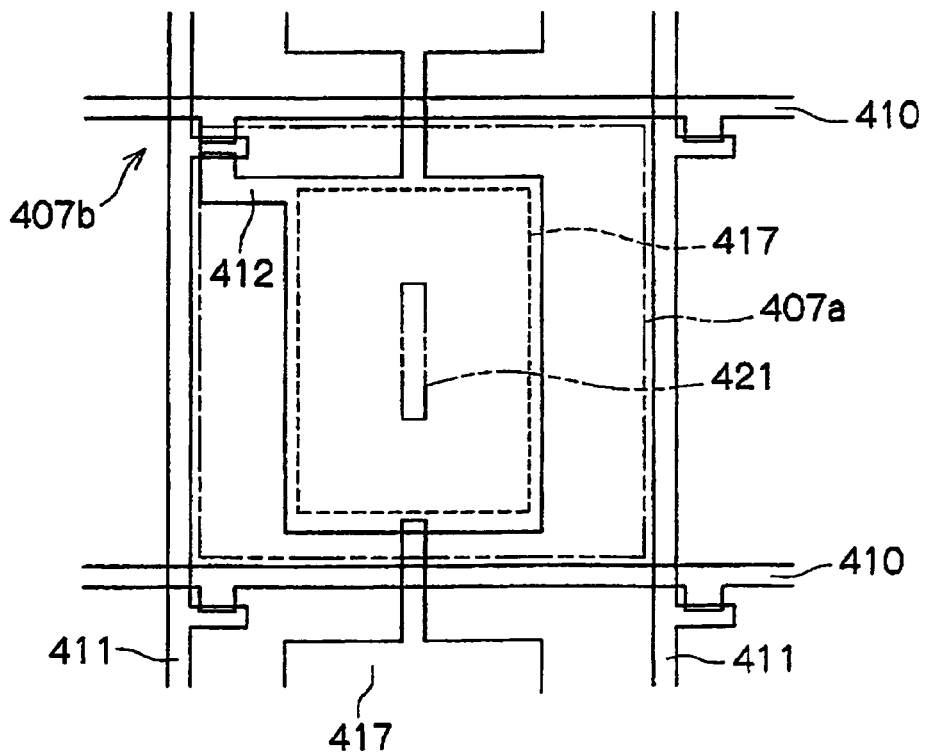

FIG. 3 is a sectional view showing a configuration of one pixel unit of the TFT type radiation detector 400, and FIG. 4 is a plan view showing this configuration. A size of one pixel shown in FIG. 3 and FIG. 4 is about 0.1 mm×0.1 mm to 0.3 mm×0.3 mm. As the whole radiation detector, this pixel is aligned in a matrix fashion of about 500×500 to 3000×3000 pixels.

As shown in FIG. 3, the active matrix substrate 450 has the glass substrate 408, gate electrodes 411, charge storage capacitor electrodes (referred to as "Cs electrodes" hereinafter) 418, a gate insulating layer 413, a drain electrode 412, a channel layer 415, a contact electrode 416, a source electrode 410, an insulation protecting layer 417, an interlayer insulating layer 420, and the charge collecting electrodes 407a.

Also, the switching element 407b formed of the thin layer transistor (TFT) is composed of the gate electrode 411, the gate insulating layer 413, the source electrode 410, the drain electrode 412, the channel layer 415, the contact electrode 416, etc. Also, the charge storage capacitor 407c is composed of the Cs electrode 418, the gate insulating layer 413, the drain electrode 412, etc.

The glass substrate 408 is a supporting substrate. As the glass substrate 408, for example, a non-alkali glass substrate (for example, #1737 manufactured by Corning Inc., or the like) can be employed. As shown in FIG. 4, the gate electrode 411 and the source electrode 410 are the electrode wirings that are aligned in grid-like fashion respectively, and the switching element 407b formed of the thin layer transistor is positioned at their intersection point.

The source/drain of the switching element 407b are connected to the source electrode 410 and the drain electrode 412 respectively. The source electrode 410 has a straight portion as a signal line and an extended portion constituting the switching element 407b. The drain electrode 412 is provided to connect the switching element 407b and the charge storage capacitor 407c.

In order to acquire the image information, a leading electrode 470 for picking out the charges collected by the charge collecting electrode 407a to the outside is connected to the source electrode 410. The leading electrode 470 is provided on the glass substrate 408 on the outside of the photoconductive layer 404.

The gate insulating layer 413 is formed of SiNx, SiOx, or the like. The gate insulating layer 413 is provided to cover the gate electrode 411 and the Cs electrode 418. A portion of the gate insulating layer 413, which locates on the gate electrode 411, acts as a gate insulating layer in the switching element 407b and a portion of the gate insulating layer 413, which locates on the Cs electrode 418 acts as a dielectric layer in the charge storage capacitor 407c. That is, the charge storage capacitor 407c is formed of an overlapping area between the Cs electrode 418 and the drain electrode 412 both formed in the same layer as the gate electrode 411. In this case, the gate insulating layer 413 is not limited to SiNx or SiOx, and an anodic oxide layer obtained by anodic-oxidizing the gate electrode 411 and the Cs electrode 418 can also be employed.

Also, the channel layer (i layer) 415 is a channel portion of the switching element 407b, and is a current path that connects the source electrode 410 and the drain electrode 412. The contact electrode (n$^+$) 416 gives a contact between the source electrode 410 and the drain electrode 412.

The insulation protecting layer 417 is formed over the substantially whole surface (substantially whole area) on the source electrode 410 and the drain electrode 412, i.e., on the glass substrate 408. Accordingly, the insulation protecting layer 417 protects the drain electrode 412 and the source electrode 410, and provides an insulating isolation between them. Also, the insulation protecting layer 417 has a contact hole 421 in its predetermined position, i.e., a portion of the drain electrode 412 that is positioned on the portion opposing to the Cs electrode 418.

The charge collecting electrode 407a is formed of an amorphous transparent conductive oxide layer. The charge collecting electrode 407a is formed to bury the contact hole 421, and is stacked on the source electrode 410 and on the drain electrode 412. The charge collecting electrode 407a and the photoconductive layer 404 are set in the electrically conductive state such that the charges generated by the photoconductive layer 404 can be collected by the charge collecting electrode 407a.

Then, the charge collecting electrode 407a will be explained in detail hereunder. The charge collecting electrode 407a employed in the exemplary embodiment is formed of an amorphous transparent conductive oxide layer. As the material of the amorphous transparent conductive oxide layer, a material whose basic composition is Indium-Tin-Oxide (ITO), Indium-Zinc-Oxide (IZO), Indium-Germanium-Oxide (IGO), or the like can be employed.

Also, as the charge collecting electrode 407a, various metal layers or various conductive oxide layers are employed. For the following reason, the transparent conductive oxide layer such as ITO (Indium-Tin-Oxide), or the like is employed in many cases. When an incident X-ray dosage in the radiation detector 400 is large, the unnecessary charges are captured in the semiconductor layer (or around the boundary between the semiconductor layer and the neighboring layer).

Since such remaining charges are stored for a long time or are moved while spending much time, such a problem arises that, when the image is detected subsequently, either the X-ray detecting characteristics are deteriorated or the remaining image (virtual image) appears. Therefore, in JP-A-9-9153 (corresponding to U.S. Pat. No. 5,563,421), such a method is disclosed that, when the remaining charges are generated in the photoconductive layer 404, the remaining charges are excited and removed by irradiating the light from the outside of the photoconductive layer 404. Here, in order to irradiate the light effectively from the lower side (the charge collecting electrode 407a side) of the photoconductive layer 404, the charge collecting electrode 407a may be transparent to the irradiated light.

Also, for the purpose of enlarging an area filling rate (fill factor) of the charge collecting electrode 407a or for the purpose of shielding the switching element 407b, it is desired that the charge collecting electrode 407a should be formed to cover the switching element 407b. However, when the charge collecting electrode 407a is opaque, the user cannot observe the switching element 407b after the charge collecting electrode 407a is formed.

For example, when the characteristic inspection of the switching element 407b is made and then the characteristic defect of the switching element 407b is found in such a situation that the switching element 407b is covered with the opaque charge collecting electrode 407a after the charge collecting electrode 407a is formed, the user cannot observe the switching element 407b by the optical microscope, or the like to clarify the cause. Therefore, it is desirable that the charge collecting electrode 407a should be transparent such that the user can observe the switching element 407b easily after the charge collecting electrode 407a is formed.

The interlayer insulating layer 420 is formed of an acrylic resin having a photosensitivity, and attains the electric insulation isolation of the switching element 407b. The contact hole 421 is passed through the interlayer insulating layer 420, and the charge collecting electrode 407a is connected to the drain electrode 412. The contact hole 421 is shaped into a reverse taper shape, as shown in FIG. 3. A high-voltage power supply (not shown) is connected between the bias electrode 401 and the Cs electrode 418.

Next, a configuration for covering the photoconductive layer 404 will be explained hereunder. As shown in FIG. 1A, a cover glass 440 as an example of the covering member to cover the bias electrode 401 is provided over the bias electrode 401.

A protecting member 442 to which the cover glass 440 is joined is provided to the glass substrate 408. The protecting member 442 is provided to surround the photoconductive layer 404, and is shaped as a whole into a box an upper portion and a lower portion of which are opened.

Also, the protecting member 442 has a side wall 442a provided upright on the outer peripheral portion of the glass substrate 408, and a flange portion 442b extended toward the upper side of the center portion of the glass substrate 408 from the upper portion of the side wall 442a, and has an L-type sectional shape.

An upper surface of the outer peripheral portion of the cover glass 440 is joined to a lower surface (inner wall) of the flange portion 442b, and is supported by the protecting member 442.

The joined portion between the protecting member 442 and the cover glass 440 is arranged on the outside of the photoconductive layer 404. That is, the protecting member 442 and the cover glass 440 is joined not over the photoconductive layer 404 but in the area where the photoconductive layer 404 is not provided on the glass substrate 408.

Here, the insulating member having an insulation property is employed as the protecting member 442. As the insulating member, polycarbonate, polyethylene terephthalate (PET), methyl acrylate (acrylic), or poly(vinyl chloride)(PVC), for example, is employed.

Also, the lower opening of the protecting member 442 is closed by the glass substrate 408 and the upper opening of the protecting member 442 is closed by the cover glass 440, and thus a closed space having a predetermined size is formed in the protecting member 442. The photoconductive layer 404 is contained in the closed space, and the photoconductive layer 404 is covered with the cover glass 440, the glass substrate 408, and the protecting member 442.

Also, a curable resin 444 is filled into a space that is surrounded by the cover glass 440, the protecting member 442, and the glass substrate 408. As the curable resin 444, a cold curable resin such as epoxy, silicon, or the like, for example, is employed.

(Forming Range of Hole Injection Blocking Layer 402)

Here, a forming range of the hole injection blocking layer 402 will be explained hereunder. When an outer edge of the hole injection blocking layer 402 as the organic polymer layer, i.e., a peripheral edge as a boundary to other layers is positioned in a predetermined position, the hole injection blocking layer 402 is formed in a predetermined range to cover the predetermined range.

In the exemplary embodiment, an outer edge portion of the hole injection blocking layer 402 is positioned between an area end G1 of an image information acquiring area G, from which the image information is acquired, and the leading electrode 470 in the area where the radiation that bears the image information is irradiated. In this case, a range indicated with an arrow A in FIG. 1A corresponds to a range located between the area end G1 of an image information acquiring area G and the leading electrode 470.

Also, preferably the outer edge portion of the hole injection blocking layer 402 according to the exemplary embodiment should be positioned on the outside of the image information acquiring area G in the area where the photoconductive layer 404 has a layer thickness that is in excess of 10% of an average layer thickness of a flat portion of the photoconductive layer 404. The average layer thickness of the flat portion of the photoconductive layer 404 is given by measuring a layer thickness at any nine points in the image information acquiring area G of the photoconductive layer 404 and then taking an average of the layer thicknesses measured at the nine points. The layer thickness is measured by observing a section with a microscope of a magnification of 100 times.

Here, a range indicated with an arrow B shown in FIG. 1A corresponds to a range located on the outside of the image information acquiring area G in the area where the photoconductive layer 404 has the layer thickness that is in excess of 10% of an average layer thickness of the flat portion of the photoconductive layer 404.

More preferably the outer edge portion of the hole injection blocking layer 402 according to the exemplary embodiment should be positioned on the outside of the bias electrode 401 in the area where the photoconductive layer 404 has a layer thickness that is in excess of 10% of an average layer thickness of a flat portion of the photoconductive layer 404.

Here, a range indicated with an arrow C shown in FIG. 1A corresponds to a range located on the outside of the bias electrode 401 in the area where the photoconductive layer 404 has the layer thickness that is in excess of 10% of an average layer thickness of the flat portion of the photoconductive layer 404.

More preferably the outer edge portion of the hole injection blocking layer 402 should be positioned on the outside of the bias electrode 401 in the area where an inclination of an end portion slope of the photoconductive layer 404 is less than 50%.

The outer edge portion of the hole injection blocking layer 402 is positioned at the end portion slope whose inclination becomes sharper gradually toward the outer edge from the flat portion of the photoconductive layer 404 in the area where the inclination is less than 50%, i.e., the range where the inclination is gentler than 50%. The wording "the inclination is 50%" indicates an inclination that is given by an oblique side, as shown in FIG. 1B, when a length of a side being extended along a layer thickness direction of the photoconductive layer 404 is set to 1 and also a length of a side being intersected orthogonally with this side is set to 2, in a rectangular triangle that is constructed by a side being extended along the layer thickness direction of the photoconductive layer 404, a side being intersected orthogonally with this side, and an oblique side. The inclination is measured by observing the section with the microscope of the magnification of 100 times.

Here, a range indicated with an arrow D shown in FIG. 1A corresponds to the range that is located on the outside of the bias electrode 401 in the area where the inclination of the end portion slope of the photoconductive layer 404 is less than 50%.

The photoconductive layer 404 is formed to have an area that is wider than the bias electrode 401. Also, the charge collecting electrode 407a is formed to have an area that is wider than the image information acquiring area G.

In this case, the outer edge portion of the hole injection blocking layer 402 according to the exemplary embodiment is positioned on the outside of the image information acquiring area G in the area of the photoconductive layer 404.

Next, the layer-forming apparatus for forming the above hole injection blocking layer 402 and the layer-forming method used there will be explained hereunder.

(Film Forming Equipment of Hole Injection Blocking Layer 402)

Figure 13:
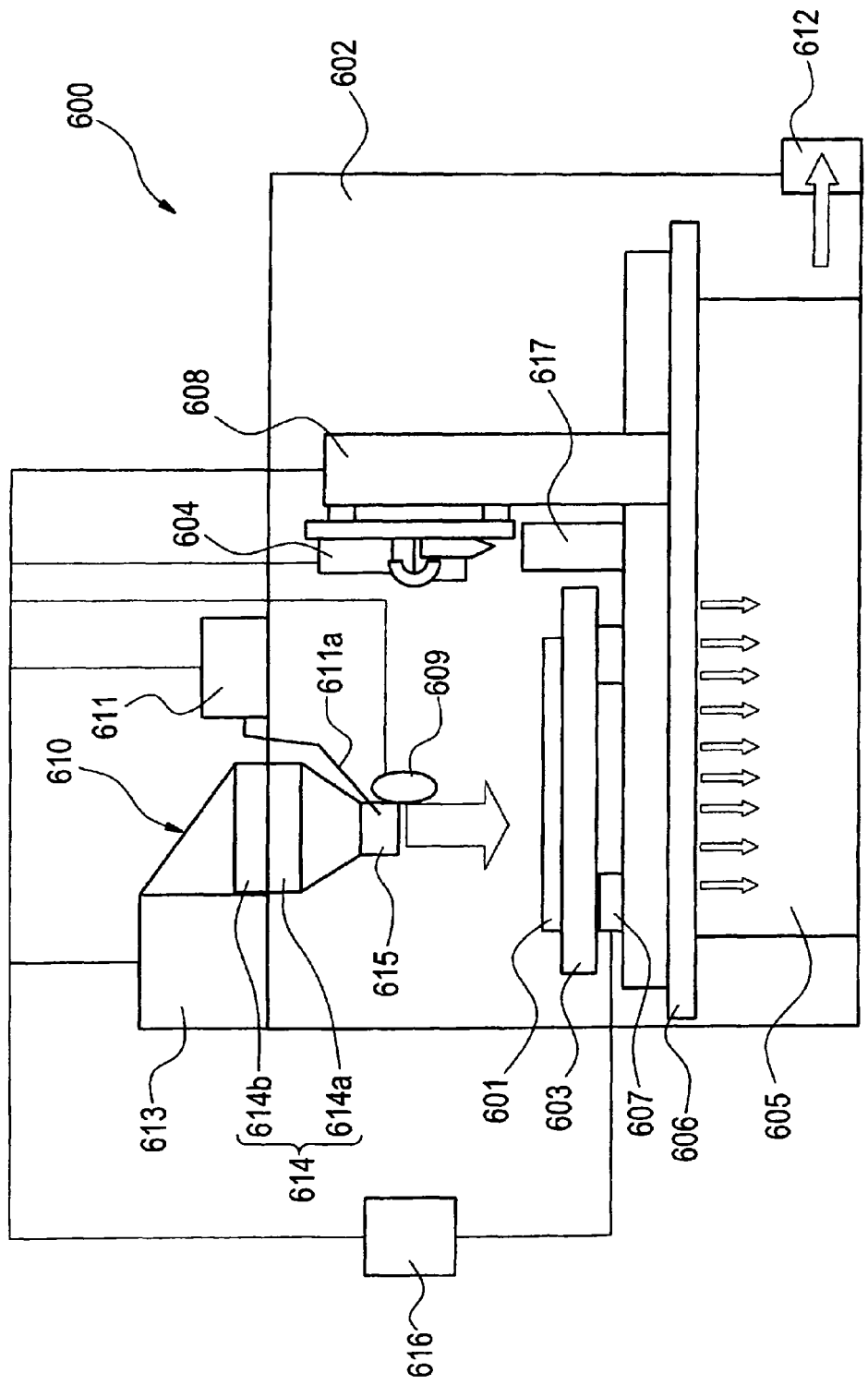

FIG. 13 shows a schematic configuration of a layer-forming apparatus 600 that is used to form the hole injection blocking layer 402. The layer-forming apparatus 600 employs a structure in which the active matrix substrate 450, the electron injection blocking layer 406, the crystallization preventing layer 405, and the photoconductive layer 404 are stacked as a base material 601, and forms the hole injection blocking layer 402 as the organic polymer layer on the surface of the photoconductive layer 404. In this case, when the crystallization preventing layer 403 is formed between the photoconductive layer 404 and the hole injection blocking layer 402, the structure in which the crystallization preventing layer 403 is stacked on the photoconductive layer 404 is used as the base material and the hole injection blocking layer 402 is formed on the surface of the crystallization preventing layer 403.

The hole injection blocking layer 402 is formed by coating a solution containing a layer component and a solvent on the surface of the base material 601. As the layer component, as described above, preferably the layer that is formed by mixing the hole blocking material into the insulating polymer such as polycarbonate, polystyrene, polyimide, polycycloolefin, or the like can be employed. In the exemplary embodiment, as the solvent, a flammable solvent such as dichlorobenzene, kerosene, ethyl alcohol, isopropyl alcohol, methyl alcohol, toluene, acetone, gasoline, or the like is employed.

The layer-forming apparatus 600 is equipped with a coating chamber 602 that is substantially hermetically sealed to coat the above solution on the surface of the base material 601. Also, the layer-forming apparatus 600 is equipped with a holding table 603 for holding the base material 601, and a coating unit 604 for coating the above solution on the surface of the base material 601 held on the holding table 603 in the coating chamber 602.

The coating of the solution by the coating unit 604 is made by various methods such as ink jet method, spray, bar coating, screen coating, and the like, but the ink jet method is better. According to the ink jet method, the layer can be formed precisely in a non-contact manner with respect to the base material 601 by a small amount of consumed liquid without a mask. In the following, explanation will be made in the assumption that the coating of the solution is executed by the ink jet method and the coating unit 604 is the ink jet head.

A vibration-isolating table 605 and a surface plate 606 supported by this vibration-isolating table 605 are provided in the coating chamber 602. Also, a holding table moving mechanism 607 for supporting the holding table 603, and a head moving mechanism 608 for supporting the ink jet head 604 are provided on the surface plate 606. The holding table moving mechanism 607 and the head moving mechanism 608 relatively move the ink jet head 604 with respect to the holding table 603 such that a surface of the base material 601 can be scanned by the ink jet head 604. For example, the holding table moving mechanism 607 moves the holding table 603 along a first axis of two horizontal/vertical axes, and the head moving mechanism 608 moves the ink jet head 604 along a second axis of two horizontal/vertical axes.

The layer-forming apparatus 600 is equipped with a concentration detector 609 for detecting a vapor concentration of the solvent in the coating chamber 602, a clean-air supplier 610 for supplying a clean air to the coating chamber 602, a corona discharger 611 for producing ions to remove the charges from the base material 601, and a spraying unit for spraying the ions produced by the corona discharger 611 onto the surface of the base material 601.

During the process in which the hole injection blocking layer 402 is formed by coating the above solution on the surface of the base material 601, the solvent is evaporated from the coated solution. The concentration detector 609 detects a vapor concentration of the solvent evaporated from the solution in the coating chamber 602. As the concentration detector 609, a publicly known gas sensor such as semiconductor gas sensor, solid electrolyte gas sensor, or the like can be employed.

The clean-air supplier 610 has a suction fan 613 for introducing an outer air into the coating chamber 602, and a filter 614 for filtering a suction air, and produces a clean air by removing the dusts from the outer air and then supplies the clean air to the coating chamber 602. Accordingly, the entry of the dusts into the coating chamber 602 can be suppressed. Preferably the clean-air supplier 610 supplies the produced clean air into the coating chamber 602 in such a way that a pressure in the coating chamber 602 becomes higher than a pressure on the outside. As a result, the entry of the dusts into the coating chamber 602 can be suppressed more surely.

The filter 614 is formed of two layers that have a different filtering mesh respectively, and a first layer 614a arranged on the coating chamber side is coarse and a second layer 614b arranged on the other side is fine. The second layer 614b could be exchanged independently. Accordingly, the entry of the dusts into the coating chamber upon exchanging the filter can be suppressed.

Also, an exhausting unit 612 such as an exhaust port, an exhausting fan, or the like, for example, is provided in the coating chamber 602. This exhausting unit 612 exhausts an atmosphere in the coating chamber 602 appropriately to the outside. A vapor concentration of the solvent in the coating chamber 602 is reduced when the clean air is supplied from the clean-air supplier 610 and the atmosphere is exhausted by the exhausting unit 612.

Typically the corona discharger 611 produces a corona discharge by applying a voltage to a needle electrode 611a, and produces ions in the atmosphere around the needle electrode 611a. The spraying unit sprays the produced ions onto the surface of the base material 601 by producing an air stream, which blows against the surface of the base material 601, in the coating chamber 602 by using a fan, or the like. As a result, the charges of the base material 601 are removed, so that the dusts adhered electrostatically to the surface of the base material 601 are ready to remove and also the new dusts are hard to adhere electrostatically to the surface. Also, the dusts adhered to the surface of the base material 601 in a non-electrostatic manner such as the falling, or the like are blown away.

As the corona discharger 611, the AC system that is superior in ion balance to the DC system is better. Among the AC systems, the pulse AC system is particularly better from an aspect of improving a dust removing efficiency and a dust removing rate of the base material 601. In this case, preferably the ion balance should be within 15 V.

Also, sometimes the needle electrode 611a of the corona discharger 611 produces the dusts along with the corona discharge. Therefore, the needle electrode 611a of the corona discharger 611 should be provided out of the area that is located over the coating area of the surface of the base material 601 on which the solution is coated. Accordingly, such a situation can be avoided that, even when the dust producing substances fall, the dusts adhere to the surface of the base material 601.

As the spraying unit, a fan, or the like may be provided separately to the coating chamber 602. In the layer-forming apparatus 600 of the exemplary embodiment, the suction fan 613 of the clean-air supplier 610 is also used as the spraying unit. In more detail, the clean-air supplier 610 has a duct 615 that is opened toward the base material 601, and sprays the clean air to the surface of the base material 601. Also, the needle electrode 611a of the corona discharger 611 is arranged on the supply path of the clean air. The ions produced by the corona discharger 611 are carried away by the clean air and sprayed to the surface of the base material 601. According to such configuration, simplification of the layer-forming apparatus 600 can be attained preferably.

The illustrated example is constructed such that an opening of the duct 615 is positioned just over the base material 601 and the clean air is blown out directly downward to the base material 601. But the present invention is not limited to this configuration. For example, the opening of the duct 615 may be positioned out of the area that located over the coating area of the surface of the base material 601, and the clean air may be blown out obliquely downward. According to such configuration, even when the suction fan 613 of the clean-air supplier 610 is also used as the spraying unit, the needle electrode 611a of the corona discharger 611 can be provided out of the area that located over the coating area of the surface of the base material 601.

(Film Forming Method of Hole Injection Blocking Layer 402)

Figure 14:
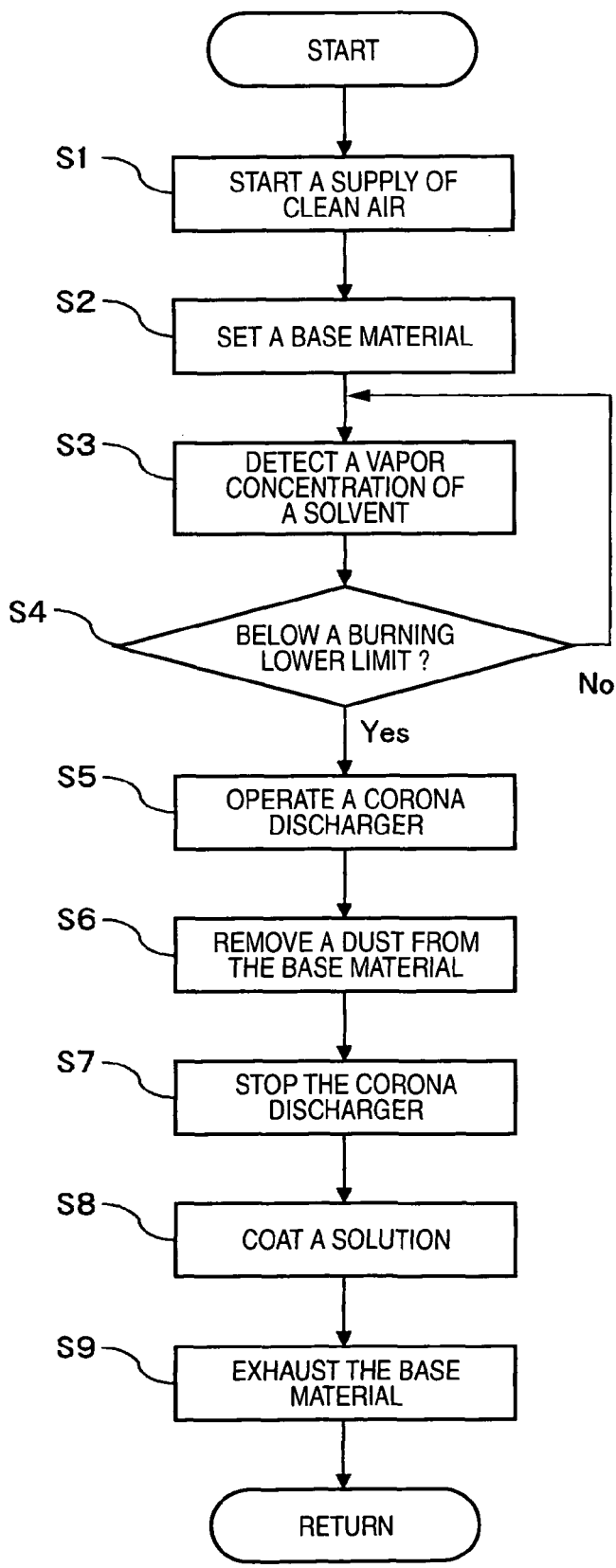

Next, an example of the layer-forming steps of the hole injection blocking layer 402 by the above layer-forming apparatus 600 will be explained with reference of FIG. 14 hereunder.

The supply of the clean air into the coating chamber 602 is started by the clean-air supplier 610 (step S1). Then, the base material 601 is set on the holding table 603 (step S2). When the layer is formed successively on a plurality of base materials, or the like, a vapor of the solvent produced in the preceding layer formation still remains in the coating chamber 602. Therefore, a vapor concentration of the solvent in the coating chamber 602 is detected by the concentration detector 609 (step S3). A controlling portion 616 causes the clean-air supplier 610 to continue the supply of the clean air into the coating chamber 602 based on the detected value of the concentration detector 609, and keeps a vapor concentration of the solvent below a burning lower limit. The controlling portion 616 decides whether or not a vapor concentration of the solvent is below a burning lower limit (step S4). If Yes in step S4, the controlling portion 616 operates the corona discharger 611 (step S5). In contrast, if No in step S4, the operation goes back to step S3.

A burning lower limit of the dichlorobenzene in the air is 2.2%. Therefore, when the dichlorobenzene is used as the solvent, a vapor concentration of the solvent in the coating chamber 602 is set below 2.2% in above step S4, less than 1.0% in light of a vapor concentration distribution. In this case, as the burning lower limit (volume %) of other components that can be used as the solvent, the kerosene is 1.2%, the ethyl alcohol is 3.3%, the isopropyl alcohol is 2.0%, the methyl alcohol is 7.3%, the toluene is 1.4%, the acetone is 2.1%, and the gasoline is 1.3%.

In this manner, when a vapor concentration of the solvent in the coating chamber 602 is lowered below a burning lower limit before the operation of the corona discharger 611 is started, the ion spraying can be carried out along with the corona discharge. Then, the ions are sprayed to the surface of the base material 601, and the dusts are removed from the base material (step S6).

The layer-forming apparatus 600 has a capping unit 617 for covering the nozzle of the ink jet head 604. When the ions are sprayed to the surface of the base material 601, the nozzle of the ink jet head 604 is capped by the capping unit 617.

After the dust removal of the base material 601 is completed, the controlling portion 616 stops the corona discharger 611 (step S7). Then, the above solution is coated on the surface of the base material 601 by driving the ink jet head 604, the holding table moving mechanism 607, and the head moving mechanism 608 (step S8).

Preferably an air speed and/or an air pressure of the clean air supplied by the clean-air supplier 610 are weakened while the solution is coated on the surface of the base material 601.

After the base material 601 is subjected to the drying for a predetermined time, the hole injection blocking layer 402 is formed on the surface of the base material 601 on which the solution is coated. Then, the base material 601 is exhausted from the coating chamber 602 (step S9).

(Principle of Operation of TFT Type Radiation Detector)

Next, the principle of operation of the above TFT type radiation detector 400 will be explained hereunder. When the X-rays are irradiated to the photoconductive layer 404, the charges (electron-hole pairs) are produced in the photoconductive layer 404. The photoconductive layer 404 and the charge storage capacitor 407c are connected electrically in series in a state that a voltage is applied between the bias electrode 401 and the Cs electrode 418, i.e., in a state that a voltage is applied to the photoconductive layer 404 via the bias electrode 401 and the Cs electrode 418. Therefore, the electrons produced in the photoconductive layer 404 move to the (+) electrode side, and the holes move to the (−) electrode side. As a result, the charges are stored in the charge storage capacitor 407c.

When the switching element 407b is put in an ON state by an input signal to the gate electrode 411, the charges stored in the charge storage capacitor 407c can be taken out to the outside from the source electrode 410 via the leading electrode 470. Also, all the electrode wiring formed of the gate electrode 411 and the source electrode 410, and the switching element 407b and the charge storage capacitor 407c are provided in a matrix fashion. Therefore, when the signal being input into the gate electrode 411 is scanned sequentially and also the signal from the source electrode 410 is detected every source electrode 410, the X-ray image information can be obtained two-dimensionally.

In Example 1, the electron injection blocking layer 406 formed of antimony sulfide whose layer thickness is 2 μm is formed on the active matrix substrate 450. Then, the layer is formed by depositing a Se material in which As is contained by 3%, and thus the crystallization preventing layer 405 whose layer thickness is 0.15 μm is formed. Then, the layer is formed by depositing the Se material in which Na is contained by 10 ppm, and thus the photoconductive layer 404 formed of an amorphous Se whose layer thickness is 1000 μm is formed.

Then, a discharged liquid, which contains at least one type of hole blocking material selected from carbon clusters or their derivates and contains at least one type of aromatic solvents expressed by General Formulae (1)(2), is prepared. Then, the hole injection blocking layer 402 as the organic polymer layer is formed by using this discharged liquid.

[Chemical Formula 1]

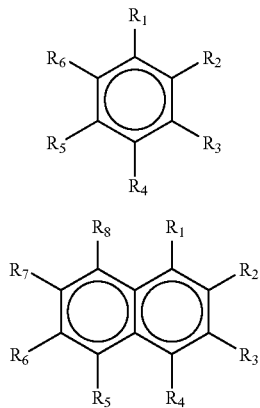

General Formula (1)

General Formula (2)

(In General Formulae (1)(2), R1-8 denotes any one of hydrogen, halogen, or alkyl group)

In Example 1, as the carbon cluster, fullerene C60 is employed. As fullerene C60, "nanom purple (C60)" manufactured by Frontier Carbon Corporation is employed.

Also, in Example 1, the discharged liquid is prepared by dissolving a polycarbonate resin (PCz) of 1.05 wt % ("EU-PIRON PCz-400" manufactured by Mitsubishi Gas Chemical Co., Inc.) and fullerene C60 of 30 wt % with respect to PCz into o-dichlorobenzene as the above aromatic solvent.

Figure 5:
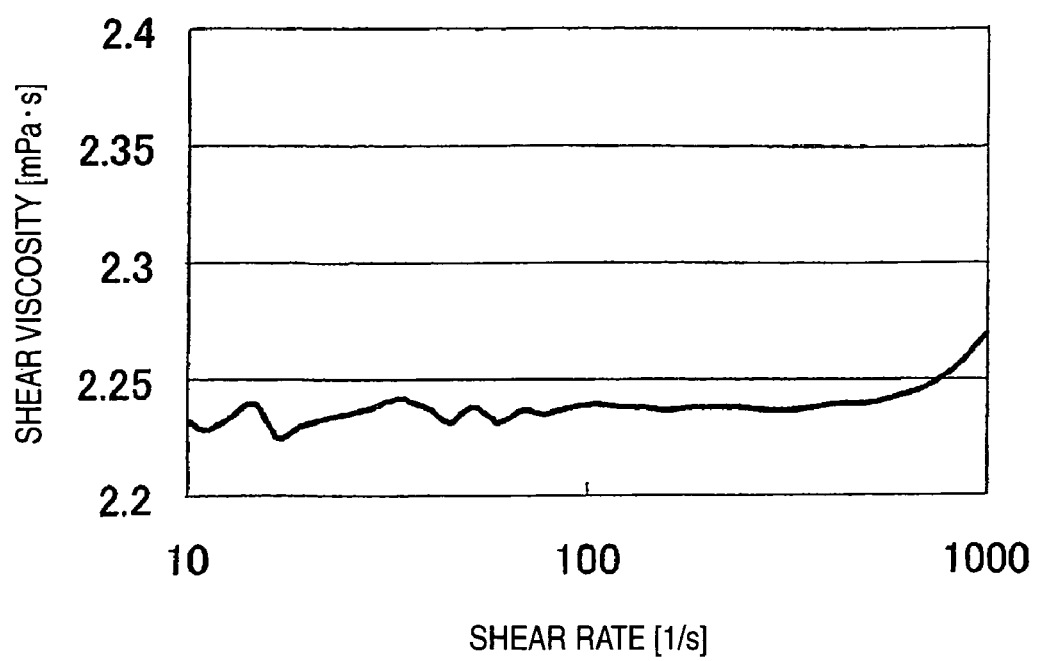

The discharged liquid exhibits the dilatancy property. The dilatancy property is a property of the liquid that a shear viscosity is increased as a shear rate is increased. A relationship between a shear rate and a shear viscosity of the discharged liquid is measured by the rheometer. The measurement is made twice in a shear rate range of 10 to 1000 [s$^{-1}$], and an average value is shown in FIG. 5. Since a shear viscosity is increased as a shear rate is increased, it is possible to say that the discharged liquid exhibits the dilatancy property.

An exponential approximate expression in a graph in FIG. 5 is given by $y=2.2331\ e^{1E-0.5x}$. It is said that the shear rate applied to the discharged liquid is normally about 105[s$^{-1}$] when the discharged liquid is discharged from the ink jet head, and it is supposed that a shear viscosity at that time is 6.07 [mPa s]. In contrast, it is considered that the shear rate is 0 [1/s] after the droplet is impacted, and thus it is supposed that a shear viscosity at that time is 2.23 [mPa s]. The viscosity is lowered after the droplet is impacted, and thus the liquid is spread easily. Therefore, it is apparent that this discharged liquid is suitable for the uniform layer formation.

Also, a contact angle of this discharged liquid to the photoconductive layer 404 is set to 45° or less. In present Example 1, the discharged liquid whose contact angle to the photoconductive layer 404 is set to 5° is employed.

The discharged liquid is filled into an "ink jet head SE-128" manufactured by FUJIFILM Dimatix Corporation, and is discharged into a range that is wider than the image information acquiring area G and does not overlap with the leading electrode 470. The hole injection blocking layer 402 of 0.2 μm thick is obtained when the solvent is evaporated by the vacuum drier. Finally, the bias electrode 401 of 0.1 μm thick is formed by depositing an Au layer on the inner side from the hole injection blocking layer 402 side.

In the configuration in Example 1, the outer edge portion of the hole injection blocking layer 402 is positioned toward the image information acquiring area G side by 1 mm from the leading electrode 470, and is positioned between the area end G1 of the image information acquiring area G, from which the image information are picked up, and the leading electrode 470.

Accordingly, the hole injection blocking layer 402 covers the image information acquiring area G of the photoconductive layer 404. Thus, deterioration such as the crystallization, or the like in the image information acquiring area G of the photoconductive layer 404 can be suppressed and durability as the radiation detector 400 can be improved. Also, the hole injection blocking layer 402 does not cover the leading electrode 470, and thus faulty conduction of the leading electrode 470 can be prevented.

In Example 2, the outer edge portion of the hole injection blocking layer 402 is positioned on the inner side by 1 mm from the bias electrode 401 end, and is positioned on the outside of the image information acquiring area G in the area where the photoconductive layer 404 has a layer thickness that is in excess of 10% of an average layer thickness of the flat portion of the photoconductive layer 404.

According to the configuration of Example 2, the hole injection blocking layer 402 having a charge selectivity does not cover the area where the photoconductive layer 404 has a layer thickness that is below 10% of an average layer thickness of the flat portion of the photoconductive layer 404, i.e., the area where a layer thickness is thin. Therefore, the creeping discharge that is caused along the hole injection blocking layer 402 is hard to occur.

In Example 3, the outer edge portion of the hole injection blocking layer 402 is positioned at the location where the photoconductive layer 404 has a layer thickness that is 50% of an average layer thickness of the flat portion of the photoconductive layer 404, and is positioned on the outside of the bias electrode 401 in the area where the photoconductive layer 404 has a layer thickness that is in excess of 10% of an average layer thickness of the flat portion of the photoconductive layer 404.

According to the configuration of Example 3, the hole injection blocking layer 402 covers the end portion of the bias electrode 401. Therefore, the discharge breakdown caused by a field concentration at the end portion of the bias electrode 401 can be suppressed.

In Example 4, the outer edge portion of the hole injection blocking layer 402 is positioned on the outer side by 2 mm from the end portion of the bias electrode 401, and is positioned on the outside of the bias electrode 401 in the area where an inclination of the end portion slope of the photoconductive layer 404 is less than 50%.

According to the configuration of Example 4, the hole injection blocking layer 402 is formed in the area where an inclination of the end portion slope of the photoconductive layer 404 is less than 50%. Therefore, even though the hole injection blocking layer 402 is formed of a liquid material, a dribbling is not caused. When a liquid puddle is produced by the dribbling, the crystallization of the fullerene C60 is brought about and the creeping discharge is ready to occur. However, in Example 4, no dribbling is caused and thus the creeping discharge can be suppressed.

In this case, the hole injection blocking layer 402 may be formed as a double-layered structure, or the antimony sulfide whose layer thickness is 0.6 μm may be stacked on the organic polymer layer containing the fullerene. According to this configuration, the hole blocking performance can be enhanced.

(Configuration of Optical Reading Type Radiation Detector)

The present invention is applicable to the optical reading type radiation detector, and may be applied based on the configuration of the hole injection blocking layer 402 in the above radiation detector 400. Next, the radiation detecting substrate 500 as the optical reading type radiation detector will be explained hereunder.

Figure 6A:
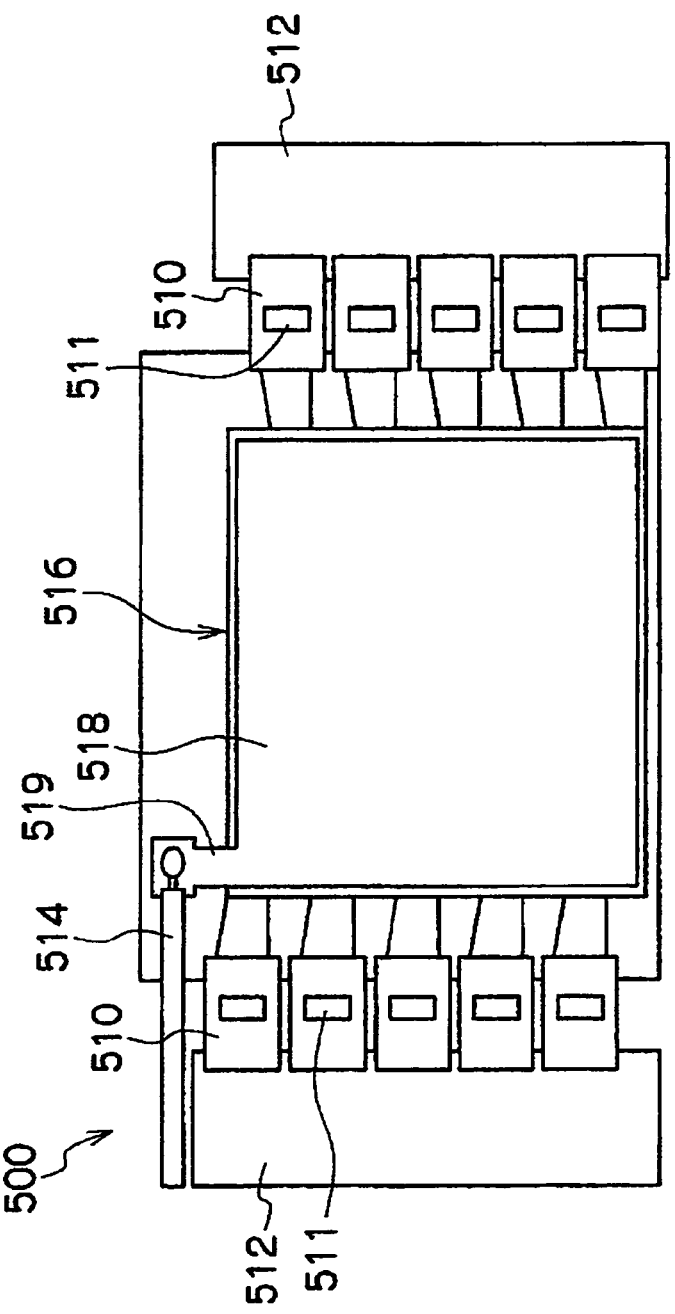
Figure 6B:
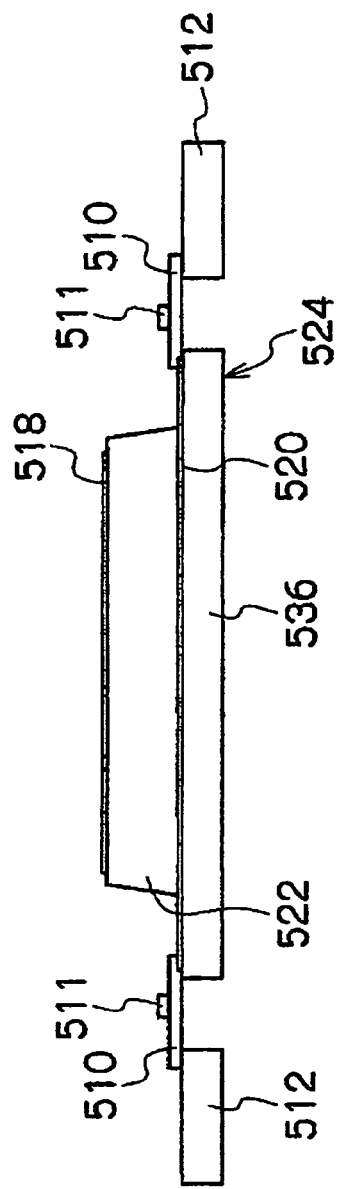

FIGS. 6A and 6B show a schematic view of the radiation detecting substrate 500 respectively. As shown in FIGS. 6A and 6B, a TCP (Tape Carrier Package) 510, a reading device 512 connected via the TCP 510, and a high-voltage line 514 for applying a high voltage are connected to the radiation detecting substrate 500.

The TCP 510 is the flexible wiring substrate on which a charge amplifier IC (charge amplifier IC) 511 is mounted. This TCP 510 is connected by the thermocompression bonding while using the ACF (Anisotropic Conductive Film).

An extended electrode portion 519 extended from an upper electrode 518 over a detection area 516 is formed. The high-voltage line 514 is connected to the extended electrode portion 519. The detection area 516 from which the radiation is detected is constructed by lower electrodes 520 used to read the signal and apply the high voltage, a radiation detecting layer 522 for converting the radiation into the charges, and the upper electrode 518 for applying the high voltage.

The lower electrodes 520 are provided to a glass substrate 536. A radiation detection lower substrate 524 is constructed by the glass substrate 536 on which the lower electrodes 520 are provided.

Roughly classifying, the manufacturing steps of the radiation detecting substrate 500 are divided into manufacture of the radiation detection lower substrate 524 containing the lower electrodes 520, formation of the radiation detecting layer 522 and the upper electrode 518, and connection of the high-voltage line 514.

Next, the structure of the radiation detection lower substrate 524 will be explained hereunder. In FIGS. 7A and 7B, a schematic configuration of the radiation detecting lower substrate 524 is shown. In FIGS. 7A and 7B, for simplification of illustration, one TCP 510 is provided on the left and right sides respectively, and the number of channels is set to three channels on the left and right sides respectively, i.e., six channels in total. As shown in FIGS. 7A and 7B, the radiation detection lower substrate 524 is constructed by a radiation detecting portion 526, pitch changing portions 528, and TCP connecting portions 530 as the leading electrodes.

The lower electrodes 520 for picking up the signal are arranged like a strip (linearly) in the radiation detecting portion 526. Also, color filter layers 534 each passing through a light of any wavelength only via a transparent organic insulating layer 532 are formed on the underlying layer.

A layer that overlies the color filter layers 534 respectively is called a common B line 520B, and a layer that locates in the portion where the color filter layer 534 is not provided is called a signal S line 520S. The B lines 520B are combined on the outside of the radiation detector to constitute a comb-type electrode structure. The S lines 520S are used as the signal lines. A width of the B line 520B is set to 20 μm, for example, a width of the S line 520S is set to 10 μm, for example, and an interval between the B line 520B and the S line 520S is set to 10 μm, for example.

A width of the color filter layer 534 is set to 30 μm, for example. The lower electrodes 520 needs a transparency to irradiate a light from the back surface and also needs a flatness to avoid the breakdown caused by the field concentration in applying a high voltage, or the like, and IZO or ITO is employed, for example. When IZO is employed, a thickness of the lower electrodes 520 is 0.2 μm, and a flatness is around Ra=1 nm.

The color filter layer 534 is a photosensitive resist into which a pigment is dispersed, for example, a red resist used in the color filter of the LCD. The photosensitive transparent organic insulating layer 532, e.g., PMMA, is employed to eliminate a level difference on the color filter layer 534.

The glass substrate 536 that is transparent and rigid is desirable as the supporting member, and also the soda-lime glass is desirable. As an example of thicknesses of respective layers, the lower electrode 520 is 0.2 μm, the color filter layer 534 is 1.2 μm, the transparent organic insulating layer 532 is 1.8 μm, and the glass substrate 536 is 1.8 mm. The color filter layers 534 and the organic insulating layer 532 are provided only to the radiation detecting portion 526, and the boundary resides in the radiation detecting portion 526 and the pitch changing portions 528. Therefore, the IZO wirings are formed on the glass substrate 536 in the TCP connecting portion 530 via the boundary stepped portion of the organic insulating layer 532.

The wirings are led to the left and right TCPs 510 every several numbers from the radiation detecting portion 526. In FIGS. 7A and 7B, one unit of three lines is shown. An example of the number of lines is 256 lines. Since the line widths in the radiation detecting portion 526 are different from the line widths in the TCP connecting portion 530 and also the wirings may be led to predetermined TCP connection positions respectively, the line widths in the radiation detecting portion 526 are changed by the pitch changing portion 528. The B lines 520B are standardized and are led similarly to the TCP connecting portion 530.

The signal S line 520S and the common B lines 520B that are standardized on the outside of the radiation detector are arranged in the TCP connecting portion 530. The common B lines 520B are arranged on the outside of the signal S line 520S. As an example of the number of lines, 256 signal lines and 5 upper common lines and 5 lower common lines are employed to connect the radiation detector to the TCP. A line/space between the electrodes is 40/40 μm.

Also, TCP alignment marks used to connect the TCP by the TCP connecting portion 530 are required. It is desirable that the alignment marks should be formed of the transparent electrode. However, since such transparent electrode is hard to recognize, the alignment marks are formed by using the color filter layer 534 that is the constitutive material of this substrate, for example, as the opaque material.

Figure 8:
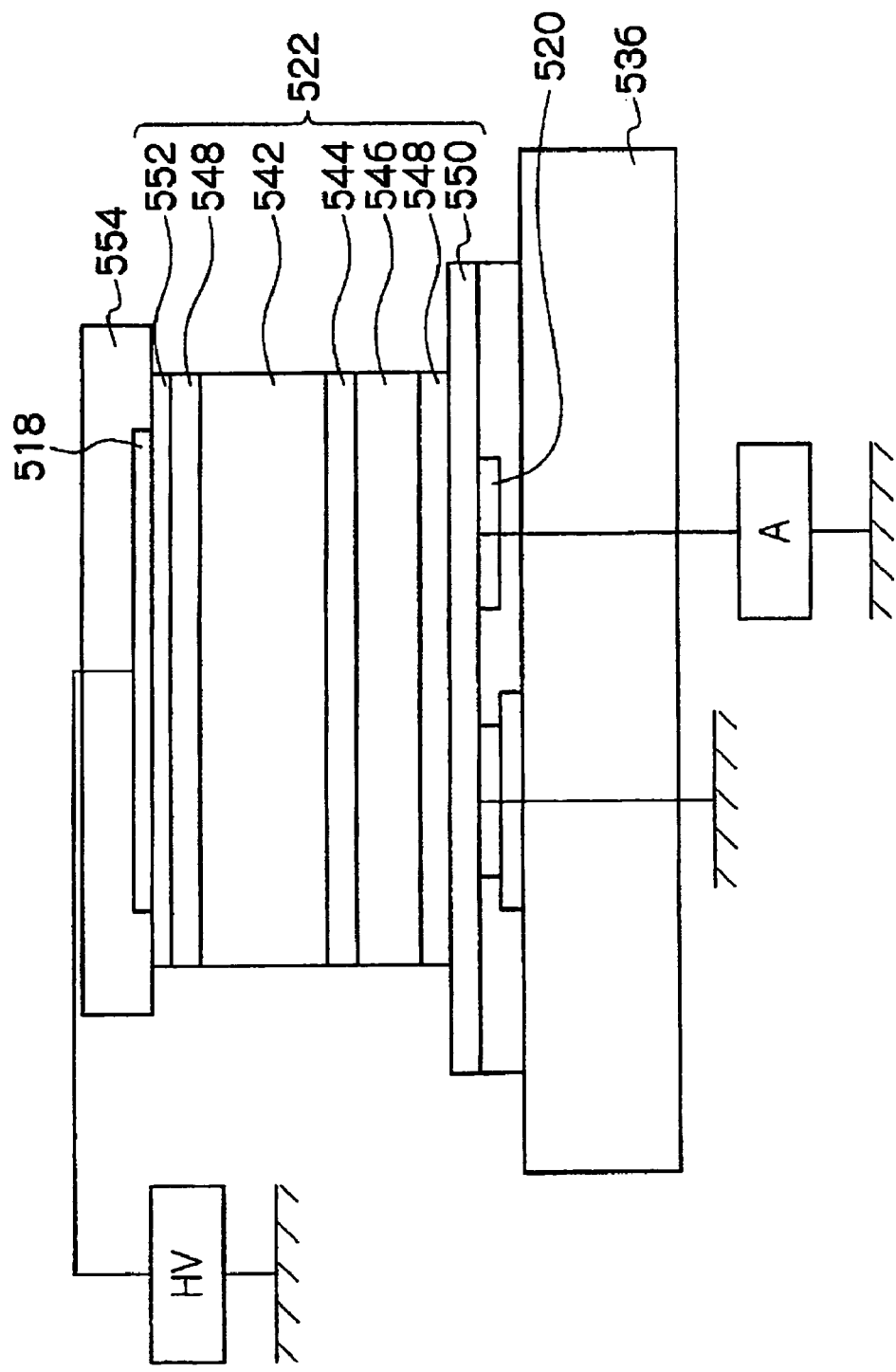

Next, the radiation detecting layer 522 will be explained hereunder. FIG. 8 is a schematic view showing schematically a configuration of the radiation detecting substrate 500. As shown in FIG. 8, the radiation detecting layer 522 is constructed to have a recording photoconductive layer 542, a charge storage layer 544, a reading photoconductive layer 546, an electrode boundary layer 548, a lower coating layer 550 and an upper coating layer 552.

<Recording Photoconductive Layer>

The recording photoconductive layer 542 is the photoconductive material that absorbs the electromagnetic wave and produces the charges. The recording photoconductive layer 542 is formed of an amorphous selenium compound, and the compound including at least one of $Bi_{12}MO_{20}$ (M:Ti, Si, Ge), $Bi_4M_3O_{12}$ (M:Ti, Si, Ge), $Bi_2O_3$, $BiMO_4$ (M:Nb, Ta, V), $Bi_2WO_6$, $Bi_{24}B_2O_{39}$, ZnO, ZnS, ZnSe, ZnTe, $MnbO_3$ (M:Li, Na, K), PbO, $HgI_2$, $PbI_2$, CdS, CdSe, CdTe, $BiI_3$, GaAs, etc. as the principal component. The recording photoconductive layer 542 is formed of the amorphous selenium compound among them.

In the case of the amorphous selenium compound, the compound formed by doping a very small quantity of alkaline metal such as Li, Na, K, Cs, Rb, or the like into the layer in a range from 0.001 ppm to 1 ppm, the compound formed by doping a very small quantity of fluoride such as LiF, NaFF, KF, CsF, RbF, or the like into the layer in a range from 10 ppm to 10000 ppm, the compound formed by adding P, As, Sb, or Ge into the layer in a range from 50 ppm to 0.5%, the compound formed by adding As into the layer in a range from 10 ppm to 0.5%, and the compound formed by doping a very small quantity of Cl, Br, or I into the layer in a range from 1 ppm to 100 ppm can be employed.

In particular, preferably the amorphous selenium in which As is contained by about 10 ppm to 200 ppm, the amorphous selenium in which As is contained by about 0.2% to 1% and Cl is contained by 5 ppm to 100 ppm, and the amorphous selenium in which alkaline metal is contained by 0.001 ppm to 1 ppm are employed.

Also, the compound in which fine grains of the photoconductive substance such as $Bi_{12}MO_{20}$ (M:Ti, Si, Ge), $Bi_4M_3O_{12}$ (M:Ti, Si, Ge), $Bi_2O_3$, $BiMO_4$ (M:Nb, Ta, V), $Bi_2WO_6$, $Bi_{24}B_2O_{39}$, ZnO, ZnS, ZnSe, ZnTe, $MnbO_3$ (M:Li, Na, K), PbO, $HgI_2$, $PbI_2$, CdS, CdSe, CdTe, $BiI_3$, GaAs, etc., whose diameter is in several nanometer to several micrometer, can be employed.

In the case of the amorphous selenium, a thickness of the recording photoconductive layer 542 should be set to 100 µm or more but 2000 µm or less. In particular, a thickness of the layer is set to a range of 150 µm or more but 250 µm or less in the mammography application, and is set to a range of 500 µm or more but 1200 µm or less in the common shooting application.

<Charge Storage Layer>

The charge storage layer 544 may be formed of a layer that has the insulating property against the charges having the polarity to be stored. The charge storage layer 544 is formed of an organic acrylic resin, a polymer such as polyimide, BCB, PVA, acrylic, polyethylene, polycarbonate, polyetherimide, or the like, sulfide such as $As_2O_3$, $Sb_2S_3$, ZnS, or the like, oxide, fluoride, and others. Further, This material should have the insulating property against the charges having the polarity to be stored and the conductivity to the charges with the opposite polarity. Also, a product of $(mobility)_x(life)$ of this material has a difference in three figures or more depending on the polarity of the charge.

As the compound, $As_2Se_3$, a compound formed by doping Cl, Br, I into $As_2Se_3$ in a range from 500 ppm to 20000 ppm, $As_2(Se_xTe_{1-x})_3 (0.5 \leq x \leq 1)$ in which Se of $As_2Se_3$ is replaced with Te up to about 50%, a compound in which Se of $As_2Se_3$ is replaced with S up to about 50%, $As_xSe_y$ (x+y=100, $34 \leq x \leq 46$) in which an As concentration is changed from $As_2Se_3$ by about ±15%, and an amorphous Se—Te compound in which Te is contained by 5 to 30 wt % can be listed.

When the material containing such chalcogenide element is employed, preferably a thickness of the charge storage layer 544 should be set to 0.4 µm or more but 3.0 µm or less, more preferably should be set to 0.5 µm or more but 2.0 µm or less. Such charge storage layer 544 may be formed at a time or may be stacked plural times.

As the charge storage layer 544 using the organic layer, preferably a compound formed by doping a charge transporting agent into a polymer such as acrylic organic resin, polyimide, BCB, PVA, acrylic, polyethylene, polycarbonate, polyetherimide, or the like should be employed. As the charge transporting agent, a molecule selected from a group consisting of tris(8-quinolinolato)aluminum($Alq_3$), N,N-diphenyl-N,N-di(m-tolyl)benzidine(TPD), polparaphenylenevinylene (PPV), polyalkylthiophene, poly(vinylcarbazole)(PVK), triphenylene (TNF), metal phthalocyanine, 4-(dicyanomethylene)-2-methyl-6-(p-dimethylamonostyryl)-4H-pyrane (DCM), liquid crystal molecule, hexapentylotriphenylene, discotic liquid crystal molecule whose center portion core contains π conjugated fused ring or transition metal, carbon nanotube, and fullerene can be listed. A dosage is set in a range between 0.1 to 50 wt %.

<Reading Photoconductive Layer>

The reading photoconductive layer 546 is a photoconductive material absorbs the electromagnetic wave, particularly the visible light, and produces the charges. The semiconductor material such as amorphous selenium compound, amorphous Si:H, crystal Si, GaAs, or the like, whose energy gap is contained in a range of 0.7 to 2.5 eV, can be employed. In particular, the amorphous selenium should be employed.

In the case of the amorphous selenium compound, the compound formed by doping a very small quantity of alkaline metal such as Li, Na, K, Cs, Rb, or the like into the layer in a range from 0.001 ppm to 1 ppm, the compound formed by doping a very small quantity of fluoride such as LiF, NaFF, KF, CsF, RbF, or the like into the layer in a range from 10 ppm to 10000 ppm, the compound formed by adding P, As, Sb, or Ge into the layer in a range from 50 ppm to 0.5%, the compound formed by adding As into the layer in a range from 10 ppm to 0.5%, and the compound formed by doping a very small quantity of Cl, Br, or I into the layer in a range from 1 ppm to 100 ppm can be employed.

In particular, preferably the amorphous selenium in which As is contained by about 10 ppm to 200 ppm, the amorphous selenium in which As is contained by about 0.2% to 1% and Cl is contained by 5 ppm to 100 ppm, and the amorphous selenium in which alkaline metal is contained by 0.001 ppm to 1 ppm are employed.

A thickness of the reading photoconductive layer 546 may be set such that the reading light can be sufficiently absorbed and the electric field generated by the charges accumulated in the charge storage layer 544 can drift the photo-excited charges. As the thickness, about 1 µm to 30 µm is better.

<Electrode Boundary Layer>

The electrode boundary layer 548 is provided between the recording photoconductive layer 542 and the upper electrode 518, or between the reading photoconductive layer 546 and the lower electrodes 520. For the purpose of preventing the crystallization, a compound formed by adding As to the amorphous selenium in a range of 1% to 20%, a compound formed by adding S, Te, P, Sb, Ge to the amorphous selenium in a range of 1% to 10%, or a compound formed by adding one of above elements and another element to the amorphous selenium in combination is better.

Otherwise, $As_2S_3$ or $As_2Se_3$, which has a higher crystallization temperature, can be employed preferably. Also, For the purpose of preventing the charge injection from the electrode layer, in particular, for the purpose of preventing the hole injection, alkaline metal such as Li, Na, K, Rb, Cs, or the like, or molecular such as LiF, NaF, KF, RbF, CsF, LiCl, NaCl, KCl, RbF, CsF, CsCl, CsBr, or the like should be doped in a range of 10 ppm to 5000 ppm, in addition to the above additive elements. In contrast, for the purpose of preventing the electron injection, halogen element such as Cl, I, Br, or the like, or molecule such as $In_2O_3$, or the like should be doped in a range of 10 ppm to 5000 ppm. A thickness of the boundary layer should be set to a range from 0.05 μm to 1 μm to fulfill the above purpose sufficiently.

The electrode boundary layer 548, the reading photoconductive layer 546, the charge storage layer 544, and the recording photoconductive layer 542 are stacked on the substrate. At that time, the substrate is held at a temperature of 25° C. or more but 70° C. or less in the vacuum chamber whose degree of vacuum is kept between $10^{-3}$ to $10^{-7}$ Torr, and then a temperature of the boat or the crucible, in which respective alloys are put, is raised by the resistance heating or the electron beam to evaporate or sublime the alloys and the compound.

When evaporation temperatures of the alloys and the compound are large different respectively, it is preferably employed that a plurality of boats, which correspond to a plurality of vapor deposition sources, should be heated simultaneously but controlled individually to control an adding concentration and a doping concentration. For example, the layer in which LiF is doped in the As-10%-doped amorphous selenium by 5000 ppm can be formed by loading $As_2Se_3$, amorphous selenium (a-Se), and LiF into a boat respectively and then opening/closing the shutters of respective boats while keeping the temperature of the boat of $As_2Se_3$, the boat of amorphous selenium (a-Se), the boat of LiF at 340° C., 240° C., and 800° C. respectively.

<Lowermost Coating Layer>

The lower coating layer 550 can be provided between the reading photoconductive layer 546 and the lower electrodes (charge collecting electrodes) 520. When the electrode boundary layer 548 (crystallization preventing layer (A layer)) is provided, the lower coating layer 550 should be provided between the electrode boundary layer 548 and the lower electrodes 520. From a viewpoint of reducing a dark current and a leakage current, preferably the lower coating layer 550 should have the rectifying characteristic. Also, the lower coating layer 550 should have the electron blocking characteristic when a positive bias is applied to the upper electrode 518, and should have the hole blocking characteristic when a negative bias is applied to the upper electrode 518.

A resistivity of the lower coating layer 550 should be set to 108 Ωcm or more and a layer thickness should be set to 0.01 μm to 10 μm. As the layer having the electron blocking characteristic, i.e., the electron injection blocking layer, either the layer having a composition such as $Sb_2S_3$, SbTe, ZnTe, CdTe, SbS, AsSe, $As_2S_3$, or the like or the organic polymer layer is better. As the organic polymer layer, the layer formed by mixing NPD, TPD with the hole transporting polymer such as PVK, or the like or the insulating polymer such as polycarbonate, polystyrene, polyimide, polycycloorefin, or the like can be employed preferably.

As the layer having the hole blocking characteristic, i.e., the hole injection blocking layer, either the layer formed of CdS, $CeO_2$, or the like or the organic polymer layer is better. As the organic polymer layer, the layer formed by mixing the carbon cluster such as fullerene C60, fullerene C70, or the like with the insulating polymer such as polycarbonate, polystyrene, polyimide, polycycloorefin, or the like can be employed preferably.

In contrast, the thin insulating polymer layer can also be employed preferably. For example, parylene, polycarbonate, PVA, PVP, PVB, polyester resin, acrylic resin such as polymethylmethacrylate, or the like is better. At this time, a layer thickness should be set to 2 μm or less preferably, and should be 0.5 μm or less more preferably.

<Uppermost Coating Layer>

The upper coating layer 552 can be provided between the recording photoconductive layer 542 the upper electrode (voltage applying electrode) 518. When the electrode boundary layer (crystallization preventing layer (C layer)) 548 is provided, preferably the upper coating layer 552 should be provided between the electrode boundary layer 548 and the upper electrode 518. From a viewpoint of reducing a dark current and a leakage current, preferably the upper coating layer 552 should have the rectifying characteristic.

Also, the upper coating layer 552 should have the hole blocking characteristic when a positive bias is applied to the upper electrode 518, and should have the electron blocking characteristic when a negative bias is applied to the upper electrode 518. A resistivity of the upper coating layer 552 should be set to 108 Ωcm or more and a layer thickness should be set to 0.01 μm to 10 μm.

As the layer having the electron blocking characteristic, i.e., the electron injection blocking layer, the organic polymer layer is better. As the organic polymer layer, the layer formed by mixing NPD, TPD with the hole transporting polymer such as PVK, or the like or the insulating polymer such as polycarbonate, polystyrene, polyimide, polycycloorefin, or the like can be employed preferably.

As the layer having the hole blocking characteristic, i.e., the hole injection blocking layer, the organic polymer layer is better. As the organic polymer layer, the layer formed by mixing the hole blocking material with the insulating polymer such as polycarbonate, polystyrene, polyimide, polycycloorefin, or the like can be employed preferably.

At least one type of the hole blocking materials contained in the hole injection blocking layer should be formed of at least one type selected from the carbon clusters or their derivatives. Also, the carbon cluster should be formed of at least one type selected from fullerene C60, fullerene C70, fullerene oxide or their derivatives.

In contrast, the thin insulating polymer layer can also be employed preferably. For example, parylene, polycarbonate, PVA, PVP, PVB, polyester resin, acrylic resin such as polymethylmethacrylate, or the like is better. At this time, preferably a layer thickness should be set to 2 μm or less, and more preferably a layer thickness should be set to 0.5 μm or less.

Next, the upper electrode 518 and a surface protection layer 554 formed on a surface of the upper electrode 518 will be explained hereunder.

<Upper Electrode>

As the upper electrode 518 formed on an upper surface of the recording photoconductive layer 542, a metal thin layer can be employed preferably. As the material, a metal such as Au, Ni, Cr, Au, Pt, Ti, Al, Cu, Pd, Ag, Mg, MgAg3-20% alloy, Mg—Ag intermetallic compound, MgCu3-20% alloy, Mg—Cu intermetallic compound, or the like may be employed.

In particular, preferably the Mg—Ag intermetallic compound can be employed. For example, when Au is employed, preferably a thickness should be set to 15 nm or more but 200 nm or less, and more preferably a thickness should be set to 30 nm or more but 100 nm or less. For example, when MgAg3-20% alloy is employed, more preferably a thickness should be set to 100 nm or more but 400 nm or less.

The forming method is selected at will, but preferably the layer should be formed by the vapor deposition using the resistance heating method. For example, a lump of metal is melted in the boat by the resistance heating method, then the metal is deposited for 15 second by opening the shutter, and then the metal is cooled once. Thus, the upper electrode can be formed by repeating the above processes plural times until the resistance value is sufficiently reduced.

<Surface Protecting Layer>

In order to form a latent image on the radiation detector by the radiation irradiation, a high voltage of several kV is applied to the upper electrode 518. When the upper electrode 518 is opened to an outer air, the creeping discharge may be caused and thus there is a danger that the subject suffers an electric shock. In order to prevent the creeping discharge on the upper electrode 518, the surface protection layer 554 is formed on the surface of the electrode and the insulating process is applied.

In the insulating process, the structure for causing the electrode surface not to touch an outer air perfectly is needed and thus the structure is hermetically covered with the insulator. Also, this insulator may have a dielectric breakdown strength that exceeds an applied electric potential. Further, there is necessity that this member does not disturb the transmission of radiation from a functional point of view of the radiation detector. As the material whose required coverage performance, dielectric breakdown strength, and radiation transmittance are high and the manufacturing method, the vapor evaporation of the insulating polymer or the coating of the solvent is better.

As concrete examples, the method of forming cold curable epoxy resin, polycarbonate resin, poly(vinyl butyral) resin, poly(vinyl alcohol) resin, acrylic resin, or polyparaxylylene derivative by the CVD method, and the like can be considered. Among them, the method of forming cold curable epoxy resin or polyparaxylylene by the CVD method is better. In particular, the method of forming polyparaxylylene derivative by the CVD method is better. Preferably a layer thickness should be set to 10 µm or more but 1000 µm or less, and more preferably a layer thickness should be set to 20 µm or more but 100 µm or less.

Since the polyparaxylylene layer can be formed at a room temperature, an insulating layer that has an extremely high step coverage can be obtained not to apply a thermal stress to the deposition subject. However, since this layer is very stable chemically, in many cases the adhesion to the deposition subject is less commonly. In order to improve the adhesion to the deposition subject, the physical or chemical processes such as coupling agent, corona discharge, plasma process, ozone cleaning, acid treatment, surface roughening, and the like are known commonly, and can be employed as the process applied to the deposition subject prior to the formation of the polyparaxylylene layer. In particular, such a method of the adhesion to the deposition subject should be improved by forming the polyparaxylylene layer after the process of coating the silane coupling agent or the silane coupling agent that is diluted with an alcohol, or the like, as the case may be, onto at least the portion, in which the adhesion to the deposition subject should be improved, of the deposition subject is applied.

Further, it is preferably that, in order to prevent time-dependent deterioration of the radiation detector, the moisture-proof process should be applied. Concretely, the radiation detector is covered with moisture-proof material. As the moisture-proof material, a resin such as the above insulating polymer, or the like that is used alone is short of function, but the resin on which at least an inorganic layer such as glass sheet, aluminum laminate layer, or the like is formed is effective. In this case, the glass attenuates the transmission of radiation, and therefore a thin aluminum laminate layer is desirable as the moisture-proof material. For example, as the aluminum laminate layer used commonly as a moisture-proof package, the laminated structure consisting of 12 µm thick PET/9 µm thick rolled aluminum/15 µm thick nylon is employed.

Preferably a thickness of the aluminum should be set to 5 µm or more but 30 µm or less. Also, preferably respective thicknesses of the PET and the nylon are set to 10 µm or more but 100 µm or less. The X-ray attenuation of this layer is about 1%, and this layer is suitable as the material that has compatibility between the moisture-proof effect and the X-ray transmission.

Figure 9:
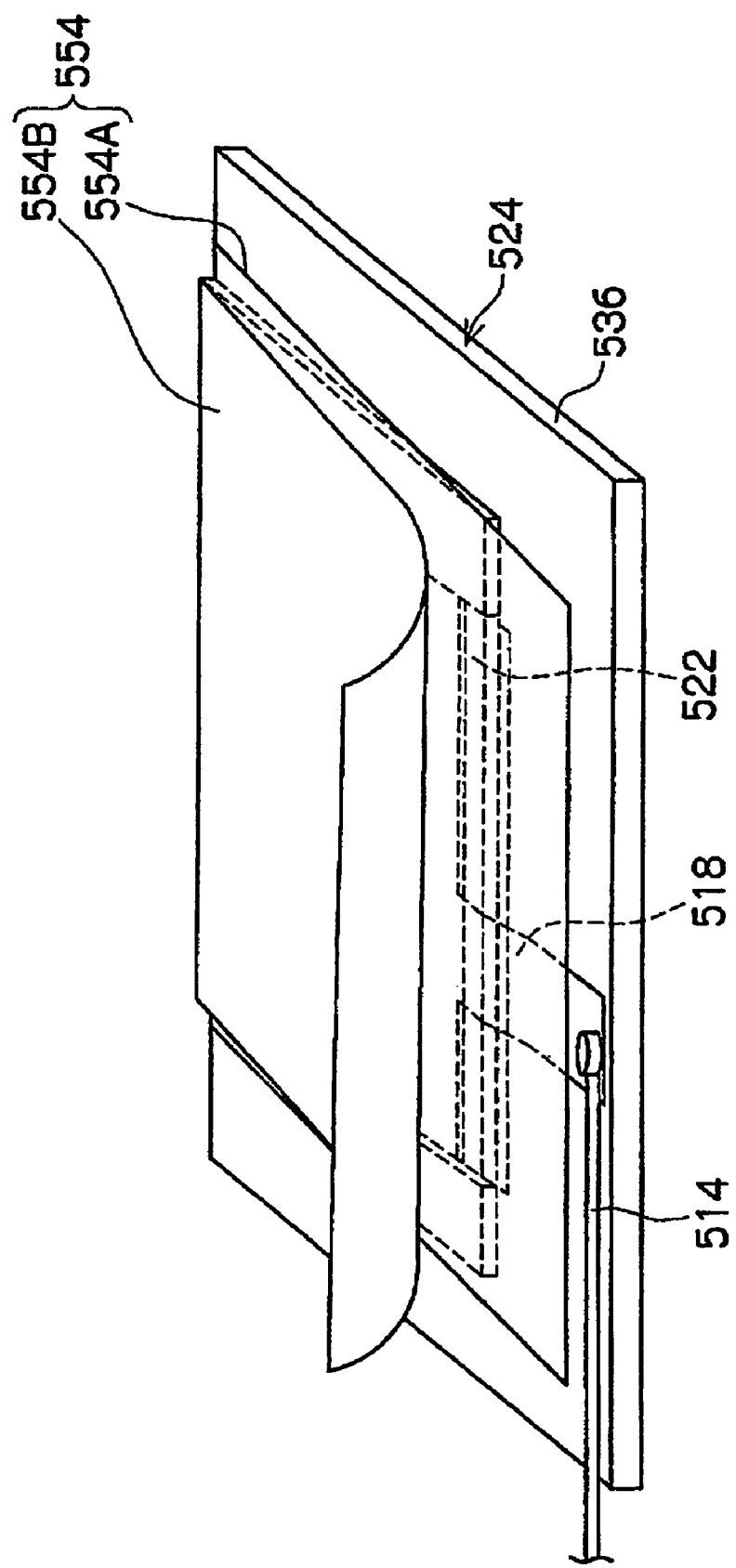

For example, as shown in FIG. 9, the whole surface of the radiation detector to which the insulating process is applied by using a polyparaxylylene 554A is covered with a moisture-proof layer 554B, and then the periphery of the moisture-proof layer 554B is adhered/fixed to the substrate by the adhesive out of the area of the radiation detector. The radiation detector is hermetically sealed with the substrate and the moisture-proof layer 554B.

Since the polyparaxylylene 554A is very chemically stable in the adhesion/fixation, commonly this polyparaxylylene has poor adhesion to other member by the adhesive. In this case, the adhesion can be improved by applying the light illumination process by using the ultraviolet light prior to the adhesion. A necessary irradiation time is adjusted adequately to an optimum time depending on a wavelength and a wattage of the used ultraviolet light source. Preferably a low-pressure mercury lamp whose wattage is 1 to 50 W should be employed, and preferably the light illumination should be made for 1 min to 30 min.

In the radiation detector according to the exemplary embodiment, the amorphous selenium is employed. It is feared that the amorphous selenium is crystallized at a high temperature of 40° C. or more and thus a function of forming a latent image is lost. Therefore, the application of the heating process is not suitable for the adhering operation. For this reason, the cold curable adhesive is desirable, and the two-fluid mixed cold curable epoxy adhesive whose bonding strength is strong is optimum. This epoxy adhesive is coated on the outer periphery of the radiation detector, and then is coated with the moisture-proof layer 554B. The adhering portion is fixed/pressed uniformly from an upper surface of the moisture-proof layer 554B, and then the adhesive is cured while still leaving in the room-temperature circumstances for two hours or more in this state. The pressure is released after the adhesive is cured, and thus the sealing structure is completed.

An explanation about the members of the sealing structure is supplemented. When the radiation detector is employed in the mammography, the shooting/detection at a low dose is desired to suppress the exposure in the X-ray photography. In order to detect a change of shadow in the low dose irradiation, it is desirable that the members except the subject (mammography) should have a high transmittance of the X ray in the path that extends from the radiation source to the radiation detector, and as a result the clear image can be obtained.

An example of the protection layer/sealing structure is illustrated in FIG. 9. But they are not limited to this example. According to the formation of the protection layer, the humidity circumstance of the radiation detector should be kept preferably at 30% or less, more preferably at 10% or less.

<Charge Extracting Amplifier>

Figure 10:
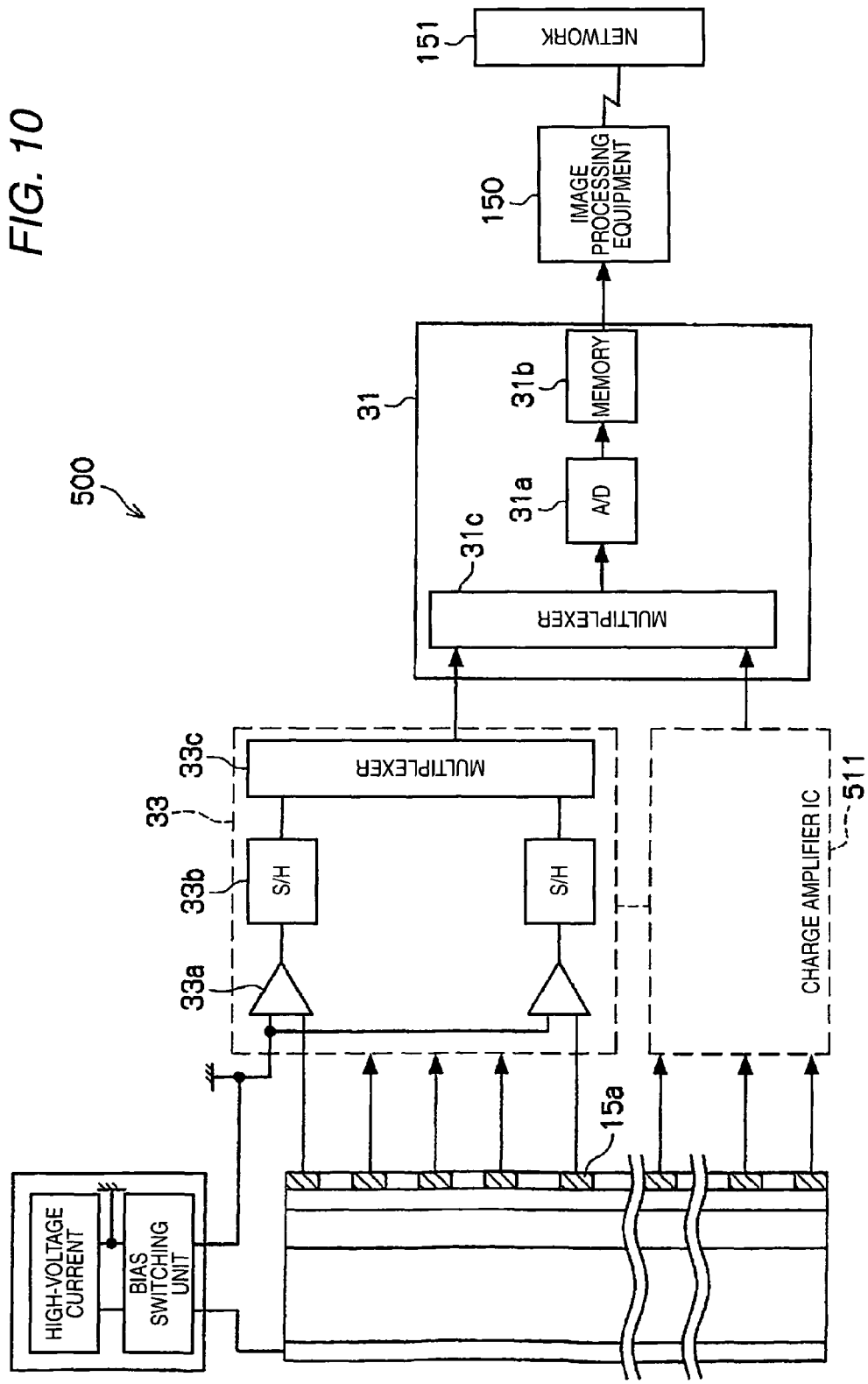

In the exemplary embodiment, the charges are amplified through the amplifier and then AD-converted. FIG. 10 is a block diagram showing a configuration of a charge extracting amplifier and connection modes of an image processing equipment 150 provided out of the radiation detecting substrate 500.

The charge amplifier IC 511 as the charge extracting amplifier is equipped with a semiconductor substrate 33 for the charge amplifier IC 511. The semiconductor substrate 33 includes a large number of charge amplifiers 33a and a large number of sample holds (S/Hs) 33b being connected in series to elements 15a of the radiation detecting substrate 500 respectively, and a multiplexer 33c for multiplexing respective signals from the sample holds (S/Hs) 33b.

The currents flown out from the lower electrodes are converted into the voltages by the charge amplifiers 33a respectively, and then the voltages are sample-held at predetermined timings by the sample holds 33b respectively. Then, the voltages being sample-held and corresponding to respective elements 15a are output sequentially from the multiplexer 33c such that these voltages are switched in order of alignment of the elements 15a (corresponding to a part of the main scanning).

The signals being output sequentially from the multiplexer 33c are input into a multiplexer 31c provided on a print-circuit board 31. Then, voltages corresponding to respective elements 15a are output sequentially from the multiplexer 31c such that these voltages are switched in order of alignment of the elements 15a. As a result, the main scanning is completed.

The signals being output sequentially from the multiplexer 31c are converted into digital signals by an A/D converting portion 31a, and then the digital signals are stored in a memory 31b. Then, image signals stored in the memory 31b once are sent to the external image processing equipment 150 via signal cables. Then, appropriate image processes are applied to the image signals in the image processing equipment 150, and the processed image signals as well as shooting information are up-loaded to a network 151 or are sent to a server or a printer.

<Image Acquiring Sequence>

Figure 11:
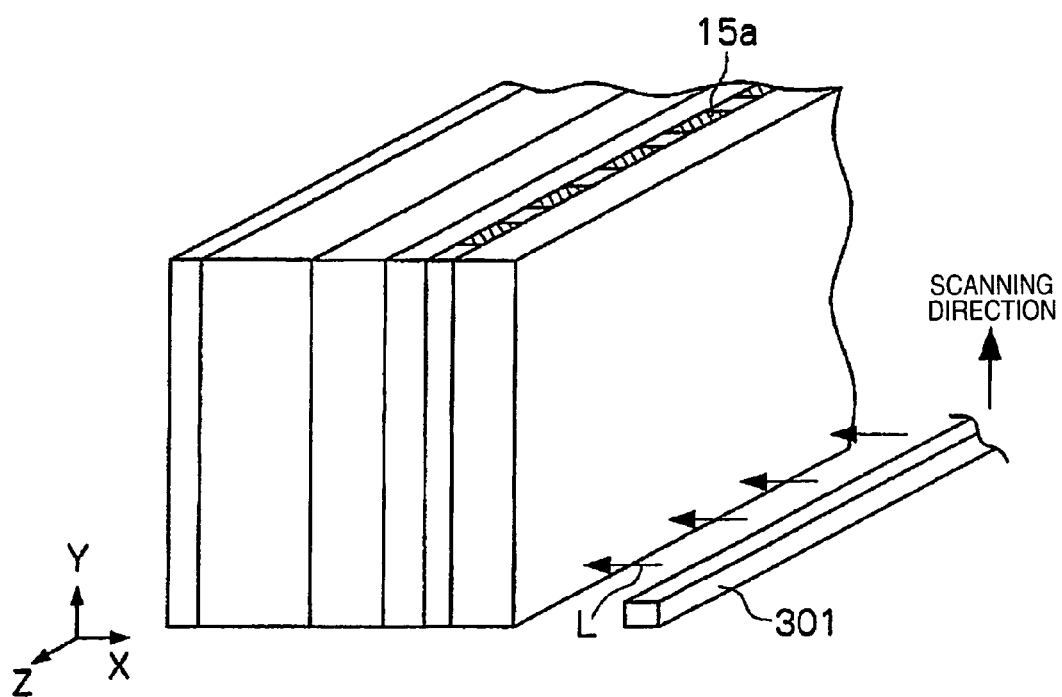

Basically the image forming sequence of the present image recording/reading system consists of the step of storing the charges of latent images by irradiating a recording light (e.g., X-rays) during the application of the high voltage, and the step of reading the charges of latent images by irradiating the reading light after the application of the high voltage is finished. As a reading light L, the method of scanning a line light source 301 in the electrode direction (see FIG. 11) is optimum. But other methods can also be applied.

Further, the step of erasing completely the remained charges of latent images can be combined together, as the case may be. This erasing step is executed by irradiating an erasing light onto the whole surface of the panel. The erasing light may be irradiated onto the whole surface at a time, and either a line light or a spot light may be scanned over the whole surface. Also, this erasing step may be executed after the reading step and/or before the step of storing the latent images. An erasing efficiency can be enhanced by combining the application of high voltage in irradiating the erasing light. Also, when a "pre-exposure" is applied after the application of the high voltage but before the recording light is irradiated, the charges produced by a dark current in applying the high voltage (dark current charges) can be erased.

Also, such a situation is known that, before the recording light is irradiated, various charges are stored in the electrostatic recording body by the causes except the above reasons. These remaining signals exert an influence upon image information signals being output subsequently, as the remaining image phenomenon. Therefore, it is desirable that the remaining image signals should be reduced by correction.

As the method of correcting the remaining image signals, the method of adding the step of reading the remaining image to the above step of recording/reading the image is effective. This step of reading the remaining image is executed by reading the "remaining image" using the reading light after only the high voltage is applied without irradiation of the recording light. Then, the remaining image can be corrected by applying the adequate process to the "remaining image" signal and then subtracting a resultant image signal from the "recording image" signal. This step of reading the remaining image is executed before or after the step of recording/reading the image. Also, the adequate erasing step can be combined before or after the step of reading the remaining image.

In the radiation detecting substrate 500 as the optically reading type radiation detector, the upper electrode 518 corresponds to a "first electrode" of the present invention, the radiation detecting layer 522 having the recording photoconductive layer 542 corresponds to a "photoconductive layer" of the present invention, the lower electrode 520 corresponds to a "second electrode" of the present invention, the TCP connecting portion 530 corresponds to a "leading electrode" of the present invention, and the upper coating layer 552 corresponds to an "organic polymer layer" of the present invention.

In the optically reading type radiation detecting substrate 500, the upper coating layer 552 can be constructed similarly to the above radiation detector 400 as follows.

The outer edge portion, i.e., the peripheral edge serving as the boundary to other layer, of the upper coating layer 552 as the organic polymer layer is positioned in a predetermined position. Thus, the upper coating layer 552 is formed in a predetermined range to cover this predetermined range.

In the exemplary embodiment, the outer edge portion of the upper coating layer 552 is positioned between the area end G1 of the image information acquiring area G, from which image information are acquired, and the TCP connecting portion 530 out of the area to which the radiation that bears the image information is irradiated. Here, a range indicated with an arrow A in FIG. 12A corresponds to the range located between the area end G1 of the image information acquiring area G and the TCP connecting portion 530.

Also, preferably the outer edge portion of the upper coating layer 552 according to the exemplary embodiment should be positioned on the outside of the image information acquiring area G in the area where the radiation detecting layer 522 has a layer thickness that is in excess of 10% of an average layer thickness of a flat portion of the radiation detecting layer 522. The average layer thickness of the flat portion of the radiation detecting layer 522 is given by measuring a layer thickness at any nine points in the image information acquiring area G of the radiation detecting layer 522 and then taking an average of the layer thicknesses measured at the nine points. The layer thickness is measured by observing a section with a microscope of a magnification of 100 times.

Figure 12:
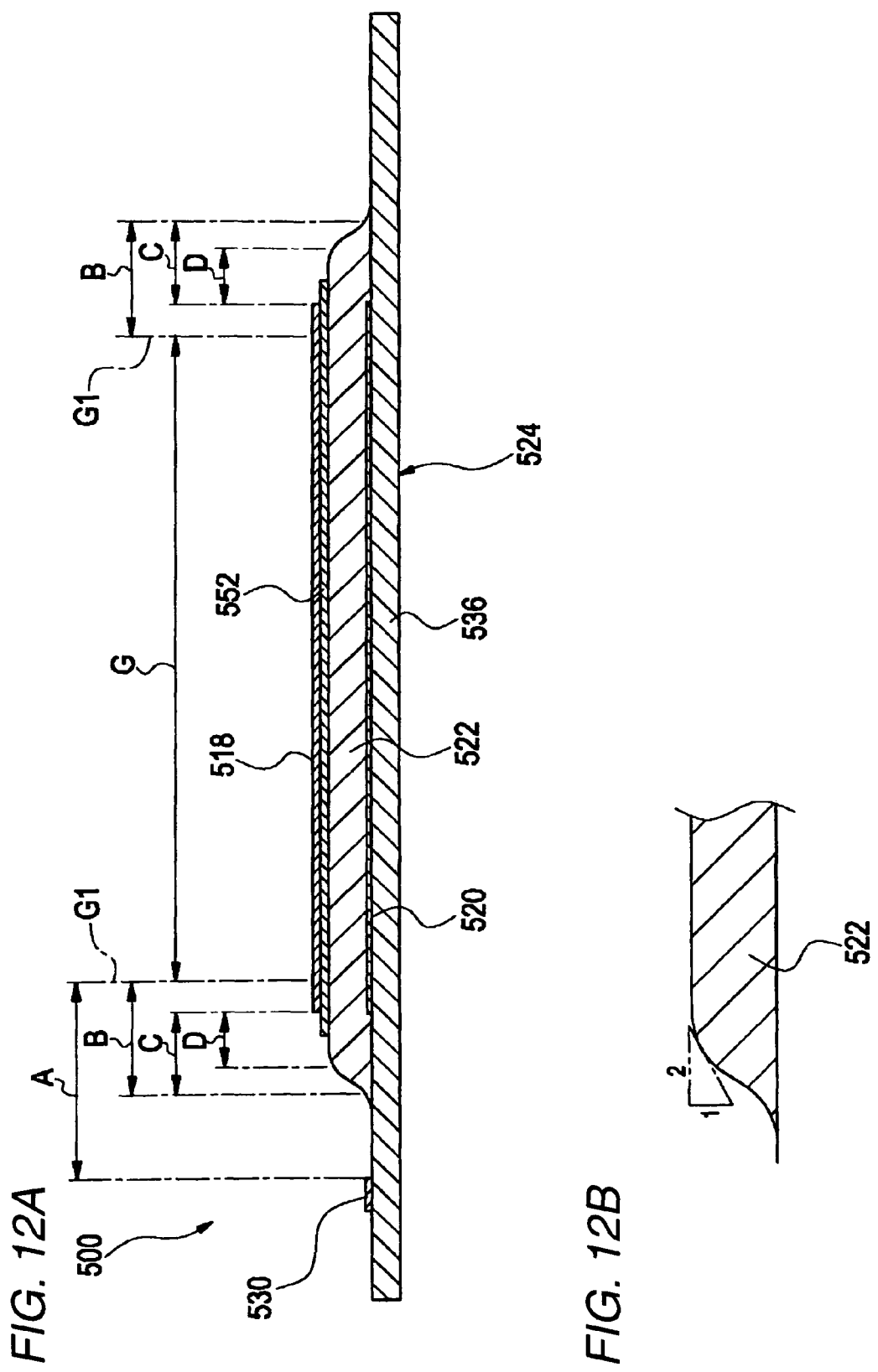
FIG. 12B is a schematic view showing a part of a photoconductive layer, FIG. 13 a view showing a schematic configuration of a layer-forming apparatus, and FIG. 14 a view showing steps of a layer-forming method.

Here, a range indicated with an arrow B in FIG. 12A corresponds to the range that is positioned on the outside of the image information acquiring area G in the area where the radiation detecting layer 522 has a layer thickness that is in excess of 10% of the average layer thickness of the flat portion of the radiation detecting layer 522.

More preferably the outer edge portion of the upper coating layer 552 according to the exemplary embodiment should be positioned on the outside of the upper electrode 518 in the area where the radiation detecting layer 522 has the layer thickness that is in excess of 10% of the average layer thickness of the flat portion of the radiation detecting layer 522.

Here, a range indicated with an arrow C in FIG. 12A corresponds to the range that is positioned on the outside of the upper electrode 518 in the area where the radiation detecting layer 522 has a layer thickness that is in excess of 10% of the average layer thickness of the flat portion of the radiation detecting layer 522.

More preferably the outer edge portion of the upper coating layer 552 should be positioned on the outside of the upper electrode 518 in the area where an inclination of an end portion slope of the radiation detecting layer 522 is less than 50%.

The outer edge portion of the upper coating layer 552 is positioned at the end portion slope whose inclination becomes sharper gradually toward the outer edge from the flat portion of the radiation detecting layer 522 in the area where the inclination is less than 50%, i.e., the range where the inclination is gentler than 50%. The wording "the inclination is 50%" indicates an inclination that is given by an oblique side, as shown in FIG. 12B, when a length of a side being extended along a layer thickness direction of the radiation detecting layer 522 is set to 1 and also a length of a side being intersected orthogonally with this side is set to 2, in a rectangular triangle that is constructed by a side being extended along the layer thickness direction of the radiation detecting layer 522, a side being intersected orthogonally with this side, and an oblique side. The inclination is measured by observing the section with the microscope of the magnification of 100 times.

Here, a range indicated with an arrow D shown in FIG. 12A corresponds to the range that is located on the outside of the upper electrode 518 in the area where the inclination of the end portion slope of the radiation detecting layer 522 is less than 50%.

In this case, the radiation detecting layer 522 is formed in the area that is wider than the upper electrode 518. Also, the lower electrode 520 is formed in the area that is wider than the image information acquiring area G.

Also, the radiation detecting layer 522 as the organic polymer layer is formed on a surface of the recording photoconductive layer 542 after the stacked structure formed by stacking the radiation detection lower substrate 524, the lower coating layer 550, the reading photoconductive layer 546, the charge storage layer 544, and the recording photoconductive layer 542 is formed as the base material. In this case, when the electrode boundary layer 548 is formed between the reading photoconductive layer 546 and the upper coating layer 552 for the purpose of preventing the crystallization, the upper coating layer 552 is formed on a surface of the electrode boundary layer 548 after the stacked structure formed by stacking the electrode boundary layer 548 on the recording photoconductive layer 542 is formed as the base material. The layer-forming steps are similar to those applied to the hole injection blocking layer 402 of the above radiation detector 400, and therefore their explanation will be omitted herein.

The present invention is not restricted to the above exemplary embodiment, and various variations, modifications, and improvements can be applied.

The layer-forming method and the layer-forming apparatus according to the present invention are not restricted to the application of manufacturing the radiation detector, and are applicable to the application of coating the resist, for example.

What is claimed is:

1. A layer-forming method comprising:
    supplying a clean air to a coating chamber which is substantially hermetically closed and in which a solution containing a layer component and a flammable solvent is to be coated on a surface of a base material;
    wherein at least one of an air speed of the clean air and an air pressure of the clean air is weakened when the solution is coated on the surface of the base material;
    removing a dust from the surface of the base material by spraying an ion, which is produced by a corona discharge, to the surface of the base material in a state that a vapor concentration of the flammable solvent in the coating chamber is below a lower limit of a flammability of the flammable solvent; and
    coating the solution on the surface of the base material from which the dust is removed.

2. The layer-forming method according to claim 1, wherein the coating is conducted by an ink jet method.

3. The layer-forming method according to claim 2, wherein a nozzle of an ink jet head utilized in the ink jet method is capped when the ion is sprayed to the surface of the base material.

4. A manufacturing method of a radiation detector which includes,
    a first electrode through which radiation carrying image information is passed,
    an organic polymer layer,
    a photoconductive layer which produces a charge by irradiating the radiation which is passed through the first electrode, and
    a second electrode which collects the charge that the photoconductive layer produces, in this order,
    the manufacturing method comprising:
    forming the organic polymer layer by a layer-forming method according to claim 1 on a surface of a base material on which at least the second electrode and the photoconductive layer is stacked.

* * * * *